(12) United States Patent
Launay et al.

(10) Patent No.: US 7,987,033 B2
(45) Date of Patent: Jul. 26, 2011

(54) METHOD FOR DETERMINING THE MORPHOLOGY OF AN OCCUPANT IN AN AUTOMOTIVE SEAT WITH CAPACITIVE SENSORS

(75) Inventors: Claude Launay, Champigny (FR); Joaquim Da Silva, Sennely (FR); Florent Voisin, Guillerval (FR); Tomoaki Hirai, Kanagawa-ken (JP); Takanori Ninomiya, Kanagawa-Ken (JP); Shunji Maeda, Kanagawa-ken (JP)

(73) Assignee: Hitachi Computer Products (Europe) S.A.S., Olivet (FR)

( * ) Notice: Subject to any disclaimer, the term of this patent is extended or adjusted under 35 U.S.C. 154(b) by 651 days.

(21) Appl. No.: 11/803,914

(22) Filed: May 15, 2007

(65) Prior Publication Data

US 2009/0088929 A1      Apr. 2, 2009

(30) Foreign Application Priority Data

May 17, 2006   (EP) ..................... 06290807

(51) Int. Cl.
*G06F 7/00* (2006.01)
(52) U.S. Cl. ............... 701/49; 701/36; 340/667

(58) Field of Classification Search .............. 701/45, 701/48; 340/666
See application file for complete search history.

(56) References Cited

U.S. PATENT DOCUMENTS

| 2002/0021215 A1 | 2/2002 | Pajon |
| 2006/0033507 A1 | 2/2006 | Gaumel et al. |

FOREIGN PATENT DOCUMENTS

EP    1308350    5/2003

*Primary Examiner* — Mark Hellner
*Assistant Examiner* — Helal A Algahaim
(74) *Attorney, Agent, or Firm* — Blakely, Sokoloff, Taylor & Zafman

(57) ABSTRACT

The present invention relates to a method determining the morphology of the occupant of an automotive car, characterized in that it comprises the steps of collecting (200) the outputs of a plurality of capacitive sensors (100) provided on a seat, determining for each capacitive sensors (100) a first value representative of the distance (di) separating a target (10) from the sensor (100) and a second value (Sdi) representative of the surface of the sensor (100) covered by the target (10), applying (210) to the second values (Sdi) representative of the surface of the sensor (100) covered by the target (10) a respective weighting (Wi) based on the corresponding first value (di) representative of the distance separating the target (10) from the same sensor (100), and determining (240) the morphology of the target (10) on the basis of the collection of weighted second values (SdixWi).

25 Claims, 24 Drawing Sheets

Figure 4:
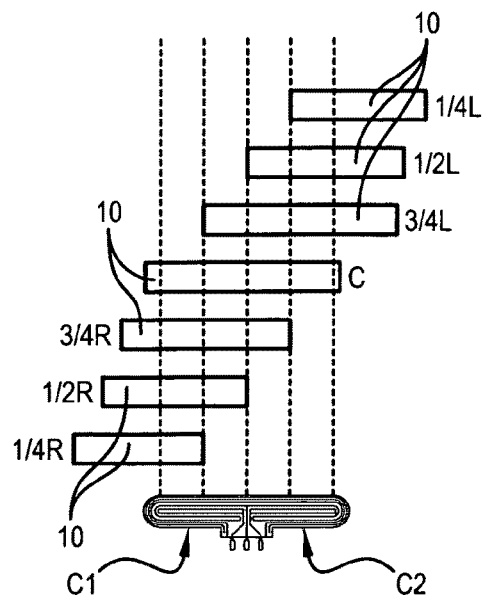

FIG. 1
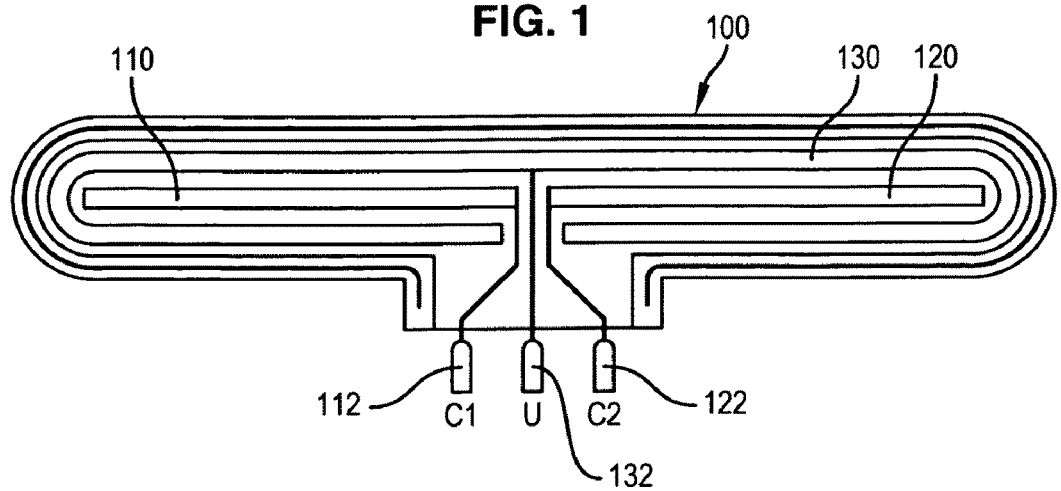
FIG. 2
|     | 110 | 120 | 130 |
|-----|-----|-----|-----|
| C1  | Vf  | Vf  | G   |
| CU1 | Vf  | Vf  | Vf  |
| C2  | Vf  | Vf  | G   |
| CU2 | Vf  | Vf  | Vf  |
FIG. 3
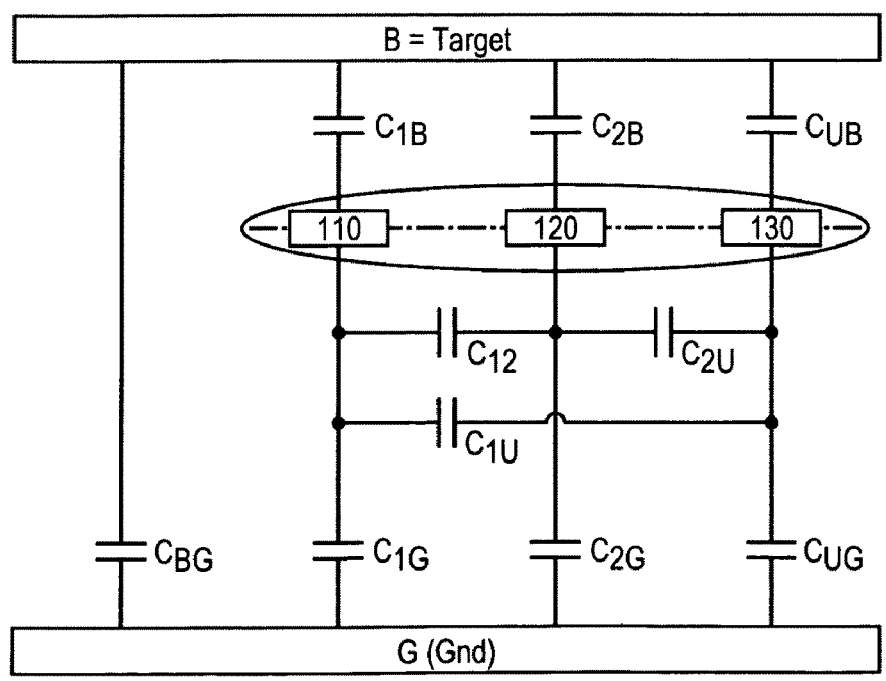

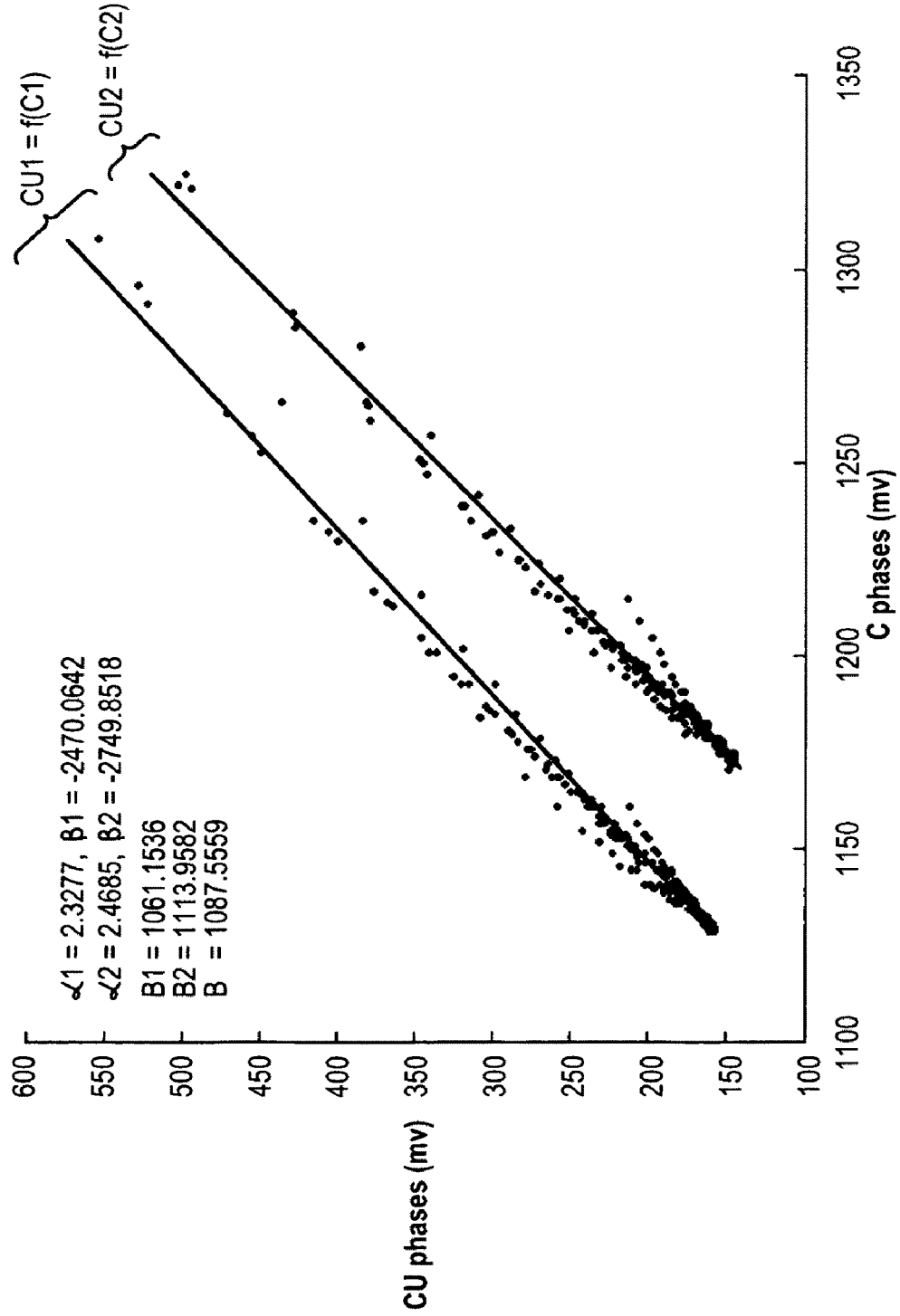

$CU_{1n} = \alpha_1 C_{1n} + \beta_1 \rightarrow B_1 = -\beta_1/\alpha_1$
$CU_{2n} = \alpha_2 C_{1n} + \beta_2 \rightarrow B_2 = -\beta_2/\alpha_2$
$B = (B_1 + B_2)/2$

Result:
$\overline{\alpha_1} = 2.37$ (min. 2.14 - max. 2.61)
$\overline{\alpha_2} = 2.48$ (min. 2.24 - max. 3.08)

| (B1+B2)/2 | Test Conditions ||
|---|---|---|
| | T [°C] | RH [%] |
| 1115 | 25 | 50 |
| 1123 | 25 | 70 |
| 1162 | 25 | 95 |
| 1143 | 40 | 50 |
| 1163 | 40 | 70 |
| 1288 | 40 | 95 |
| 1150 | 55 | 50 |
| 1166 | 55 | 70 |
| 1386 | 55 | 95 |
| 1173 | 70 | 50 |
| 1239 | 70 | 70 |
| 1537 | 70 | 95 |

| | Temp | Hygro | B1+B2 / 2 | CU1n Ave | CU1n Max | CU1n Min | CU1n delta [%] | CU2n Ave | CU2n Max | CU2n Min | CU2n delta [%] |
|---|---|---|---|---|---|---|---|---|---|---|---|
| ◁ | 25 | 50 | 1115 | 160 | 163 | 157 | 3.7 | 149 | 150 | 146 | 2.7 |
| ◁ | 25 | 70 | 1123 | 161 | 162 | 158 | 2.5 | 149 | 151 | 146 | 3.4 |
| ◀ | 25 | 95 | 1162 | 162 | 164 | 160 | 2.5 | 149 | 152 | 146 | 4.0 |
| ✳ | 40 | 50 | 1142 | 160 | 161 | 157 | 2.5 | 148 | 150 | 144 | 4.1 |
| ✧ | 40 | 70 | 1163 | 161 | 162 | 159 | 1.9 | 148 | 150 | 144 | 4.1 |
| ○ | 40 | 95 | 1288 | 167 | 169 | 165 | 2.4 | 149 | 151 | 145 | 4.0 |
| ◇ | 55 | 50 | 1150 | 161 | 163 | 159 | 2.5 | 150 | 151 | 147 | 2.7 |
| □ | 55 | 70 | 1166 | 162 | 163 | 158 | 3.1 | 149 | 151 | 146 | 3.4 |
| ◉ | 55 | 95 | 1386 | 170 | 173 | 168 | 2.9 | 158 | 160 | 154 | 3.8 |
| △ | 70 | 50 | 1204 | 162 | 165 | 160 | 3.1 | 150 | 152 | 147 | 3.3 |
| ▽ | 70 | 70 | 1239 | 162 | 165 | 160 | 3.1 | 151 | 153 | 148 | 3.3 |
| ● | 70 | 95 | 1537 | 201 | 204 | 198 | 3.0 | 173 | 176 | 168 | 4.6 |

$W_i = (d_i - d_{inf}) / (min(d_{1\to 6}) - d_{inf})$

FIG. 23

| SENSOR OUTPUT | | SENSOR S1 AND S2 (LEFT SIDE) | | |
|---|---|---|---|---|
| | | TREATMENT | | REM |
| S1 | S2 | S1 | S2 | |
| E | E | — | — | |
| | L | — | • | |
| | C | — | Σ | |
| | R | — | Σ | |
| L | E | — | — | Hole detection |
| | L | — | • | |
| | C | — | Σ | |
| | R | — | Σ | |
| C | E | — | — | Hole detection |
| | L | • | • | |
| | C | ◀ | Σ | |
| | R | ◁ | Σ | |
| R | E | — | — | Hole detection |
| | L | • | • | |
| | C | ◀ | Σ | |
| | R | ◁ | Σ | |

With:
E: Si is empty           >> Empty
L: Si > 1 + α            >> Left
C: 1 - α =< Si =< 1 + α  >> Center
R: Si < 1 - α            >> Right
— : Empty
Σ : Normally summation
• : Elimination case
◀ : Conditional summation only with S1 < S2 + β otherwise elimination
◁ : Conditional summation only with S5=0 otherwise elimination
α <> β coefficient taking in account the seat real word for surface estimation. An example is α=0.25 and β=0.125

| SENSOR OUTPUT | | SENSOR S5 AND S6 (RIGHT SIDE) | | |
|---|---|---|---|---|
| | | TREATMENT | | REM |
| S6 | S5 | S6 | S5 | |
| E | E | — | — | |
| | L | — | • | |
| | C | — | Σ | |
| | R | — | Σ | |
| L | E | — | — | Hole detection |
| | L | — | • | |
| | C | — | Σ | |
| | R | — | Σ | |
| C | E | — | — | Hole detection |
| | L | • | • | |
| | C | ◀ | ◀ | |
| | R | ◁ | Σ | |
| R | E | — | — | Hole detection |
| | L | • | • | |
| | C | ◀ | ◀ | |
| | R | ◁ | Σ | |

With:
E: Si is empty           >> Empty
R: Si < 1 - α            >> Right
C: 1 - α =< Si =< 1 + α  >> Center
L: Si > 1 + α            >> Left
— : Empty
Σ : Normally summation
• : Elimination case
◀ : Conditional summation only with S6 > S5 - β otherwise elimination
◁ : Conditional summation only with S2=0 otherwise elimination
α <> β coefficient taking in account the seat real word for surface estimation. An example is α=0.25 and β=0.125

METHOD FOR DETERMINING THE MORPHOLOGY OF AN OCCUPANT IN AN AUTOMOTIVE SEAT WITH CAPACITIVE SENSORS

The present invention relates to the technical field of sensors area.

More precisely, the present invention concerns a system and a method to determine the morphology of a passenger seated in an automotive seat fitted with several capacitive sensors.

A non exclusive implementation of the present invention relates to control the airbag triggering in a car.

In the last past years, airbag in automotive area were triggered, in case of shock, by means of an accelerometer. This basic triggering didn't take in account the occupant morphology (child, small adult, medium adult, and large adult).

Generally known airbags were triggered even if the seat is empty or occupied by a baby seated in a "CRS" (Child Restrain Seat). This last case very serious is the cause of numerous deaths.

For these reasons henceforth some vehicles are fitted out with a switch allowing disabling airbag triggering when a CRS is mounted in seat. This switch is linked with a light indicator situated on dashboard showing the state of airbag device triggering: "on" state or "off" state.

Since year 2003 a most restricting regulation was launched in US (FMV SS 208 regulation) compelling car manufacturer to fit out at least a third part of global car production with a detecting passenger device called "OCS" (Occupant Classification System).

It is noticed that the airbag must not be triggered in the following conditions:
If the seat is empty,
If the seat is occupied by a baby seated in CRS,
If the seat is occupied by a child less 6 years old (less than 26 kg).

Independently regulations which will be set, business constraints all over the world, lay down an airbag smart triggering; that is to mean:
No air bag triggering:
for an empty seat,
for a seat occupied by a baby seated in CRS,
for a seat occupied by a child less 6 years old (less than 26 kg),
Monitoring the airbag power according to occupant morphology defined as following:
$5^{th}$ percentile class (46-53 kg/1.40-1.65 m) linked to small adult,
50 th percentile class (68-73 kg/1.70-1.8 m)-linked to medium adult,
95 th percentile class (94-98 kg/1.83-1.93 m) linked to large adult.

However at the present time no system or method offers a fully satisfactory solution for that.

The Applicant has filed on Jul. 28, 2005 a French patent application under number FR-0508072, which describes a technical structure of a capacitive sensor allowing detecting if the sensor is covered or not by a target.

The aim of the present invention is now to improve this structure for allowing a more precise determination of the morphology of a passenger seated in an automotive seat fitted with several capacitive sensors.

This aim is achieved according to the present invention with a method comprising the steps of collecting the outputs of a plurality of capacitive sensors provided on a seat, determining for each capacitive sensors a first value representative of the distance separating a target from the sensor and a second value representative of the surface of the sensor covered by the target, applying to the second values representative of the surface of the sensor covered by the target a respective weighting based on the corresponding first value representative of the distance separating the target from the same sensor, and determining the morphology of the target on the basis of the collection of weighted second values.

According to a specific and non limitative feature of the present invention, the respective weighting coefficient is determined by function $$Wi=(di-dinf)/[\min(d1 \text{ to } dp)-dinf], \text{ wherein}$$

di=distance calculated for each sensor i,
dinf=an estimated infinite distance, that is to mean when seat is considered empty (for example 20 mm).
min(d1 to dp)=minimum distance calculated for all p sensors.

According to another preferential feature, the method of the present invention comprises also a step of coherence for eliminating all non coherent profile of morphology.

According to another preferential feature, the method of the present invention implements a capacitive sensor comprising at least two electrodes covering complementary respective areas of a sensed zone so as to form two balanced pixel sensors.

According to another preferential feature, the method of the present invention implements a capacitive sensor comprising three electrodes: two main electrodes covering complementary respective areas of a sensed zone and a third auxiliary electrode covering both said complementary respective areas.

According to another preferential feature, the method of the present invention implements a capacitive sensor wherein said third auxiliary electrode surrounds the two main electrodes.

According to another preferential feature, the method of the present invention comprises the steps of applying respective controlled electric potentials upon said electrodes and subsequently, after breaking said electrical potentials, measuring the electric charges upon at least one selected electrode so as to generate an electrical output.

According to another preferential feature, the method of the present invention implements a step of selecting a value representative of the distance separating the target from the sensor, from a look up table, using as input for this selection a combination of the outputs issued by the capacitive sensor.

According to another preferential feature, the method of the present invention implements a step of selecting a value representative of the amount of the surface of the sensor covered by said target, from a look up table, using as input for this selection a combination of the outputs issued by the capacitive sensor.

According to another preferential feature, the method of the present invention implements look up tables which contain values representative of the distance separating the target from the sensor and/or values representative of the amount of the surface of the sensor covered by said target, for a plurality of temperature and humidity values, and the method comprises the step of selecting in the look up tables an output value depending on a combination of the outputs issued by the capacitive sensor which represents real temperature and humidity.

The present invention also relates to a system for implementing the above method as well as a seat for automotive car comprising such a system.

Figure 5A:
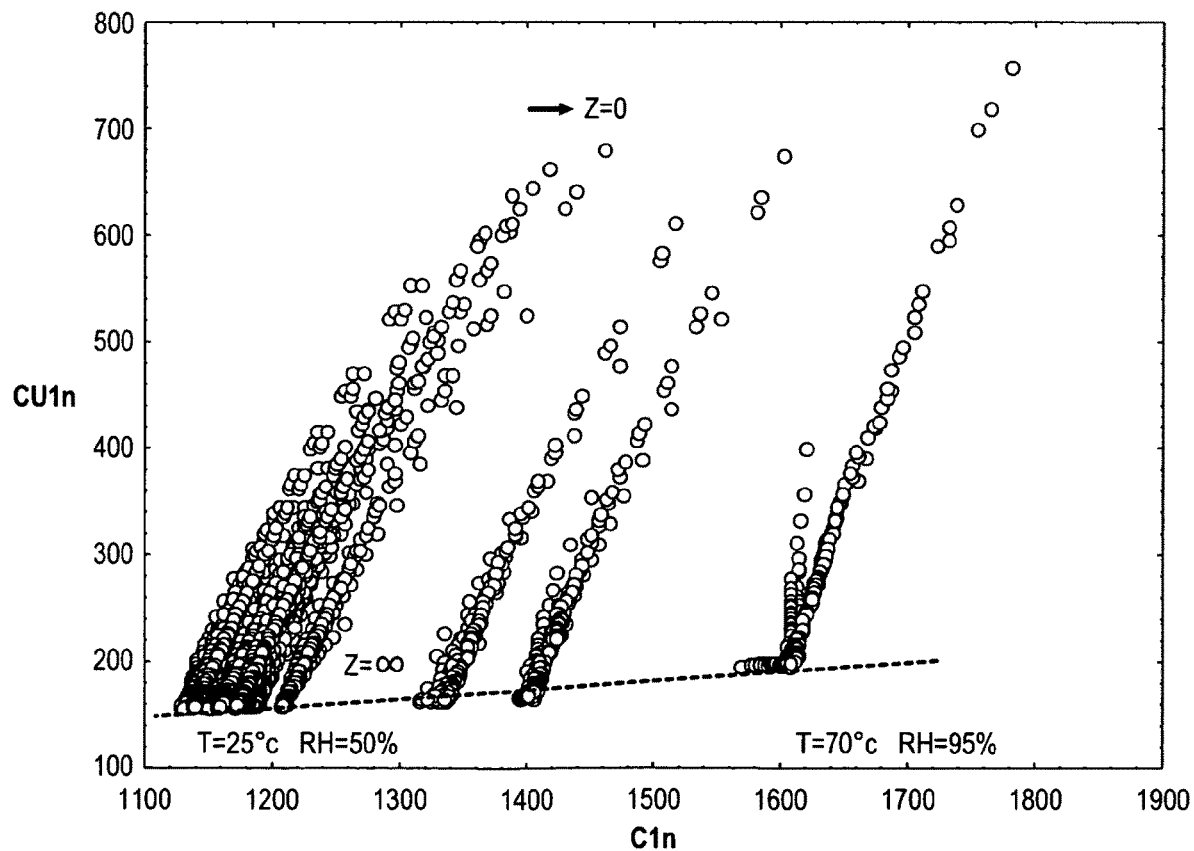
Figure 5B:
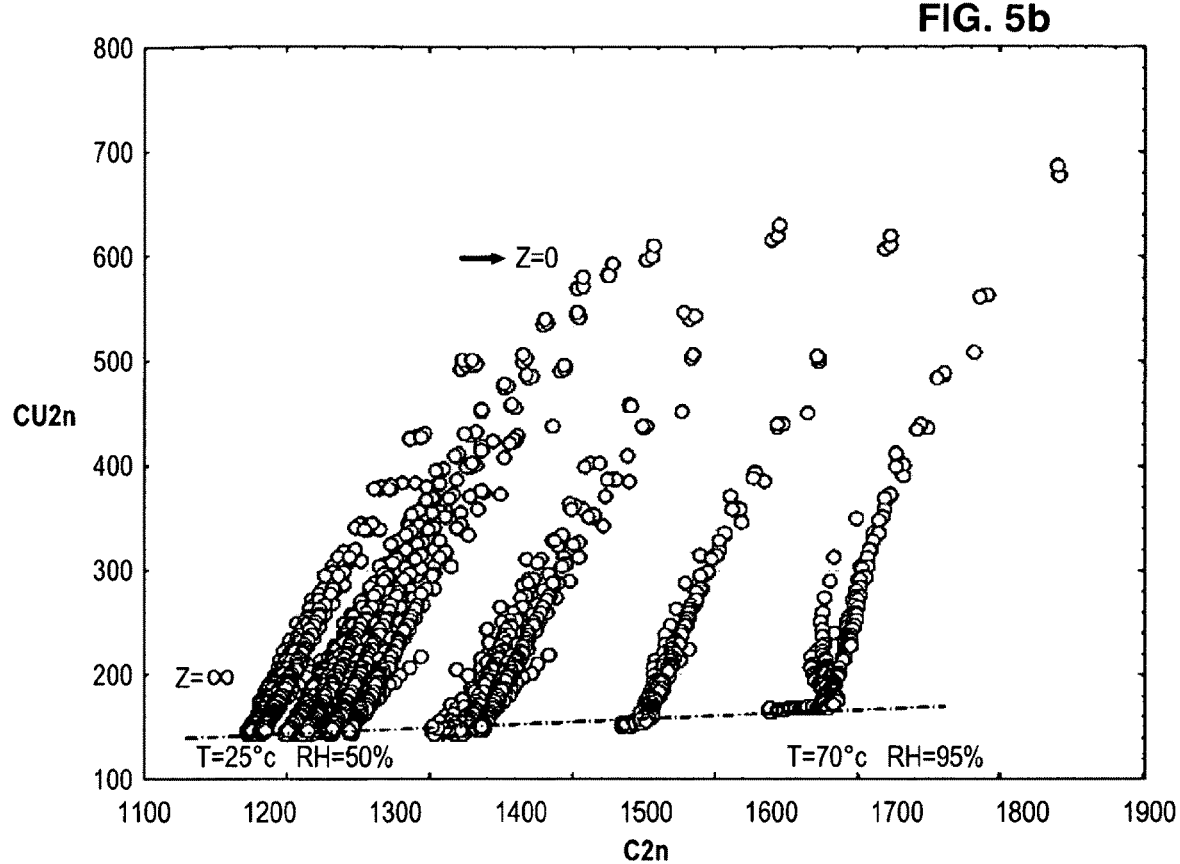
Figure 6:
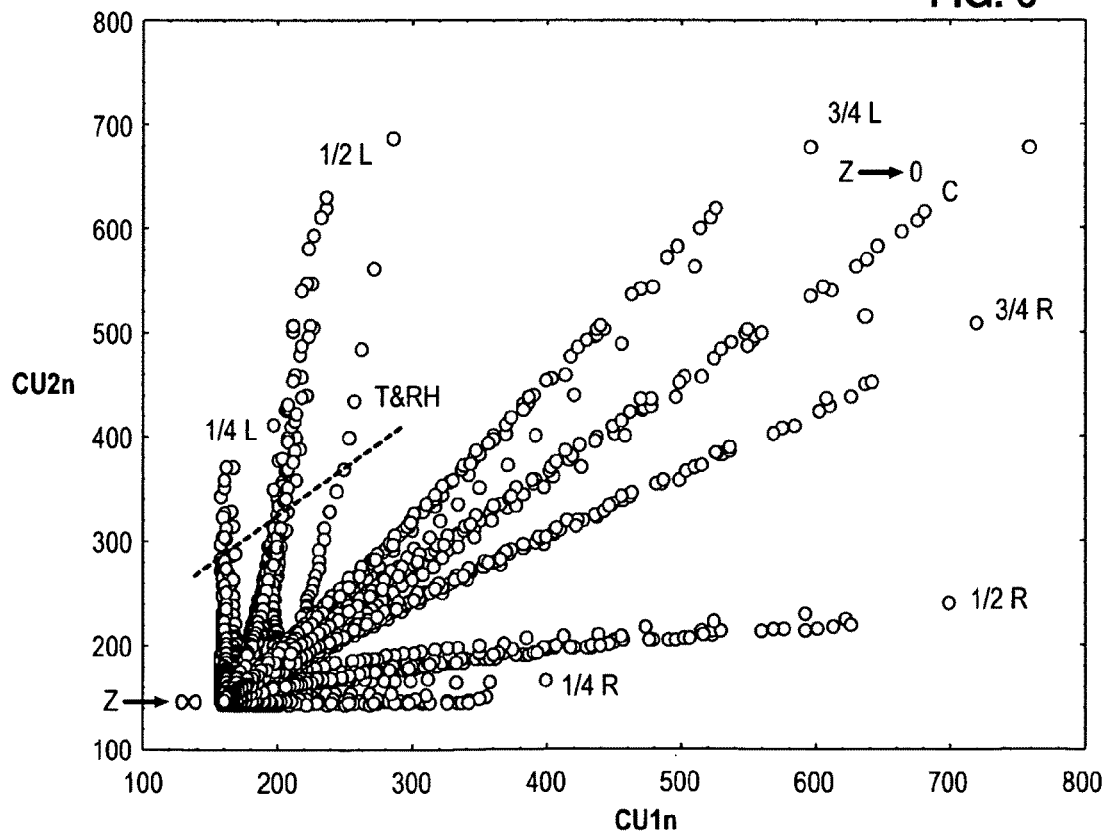
Figures 7B, 7C:
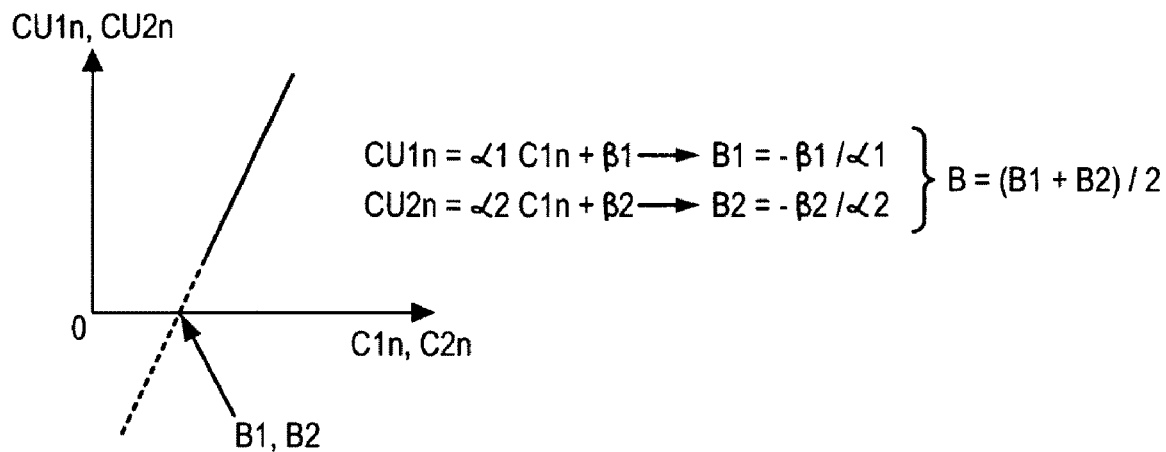
Figure 8A:
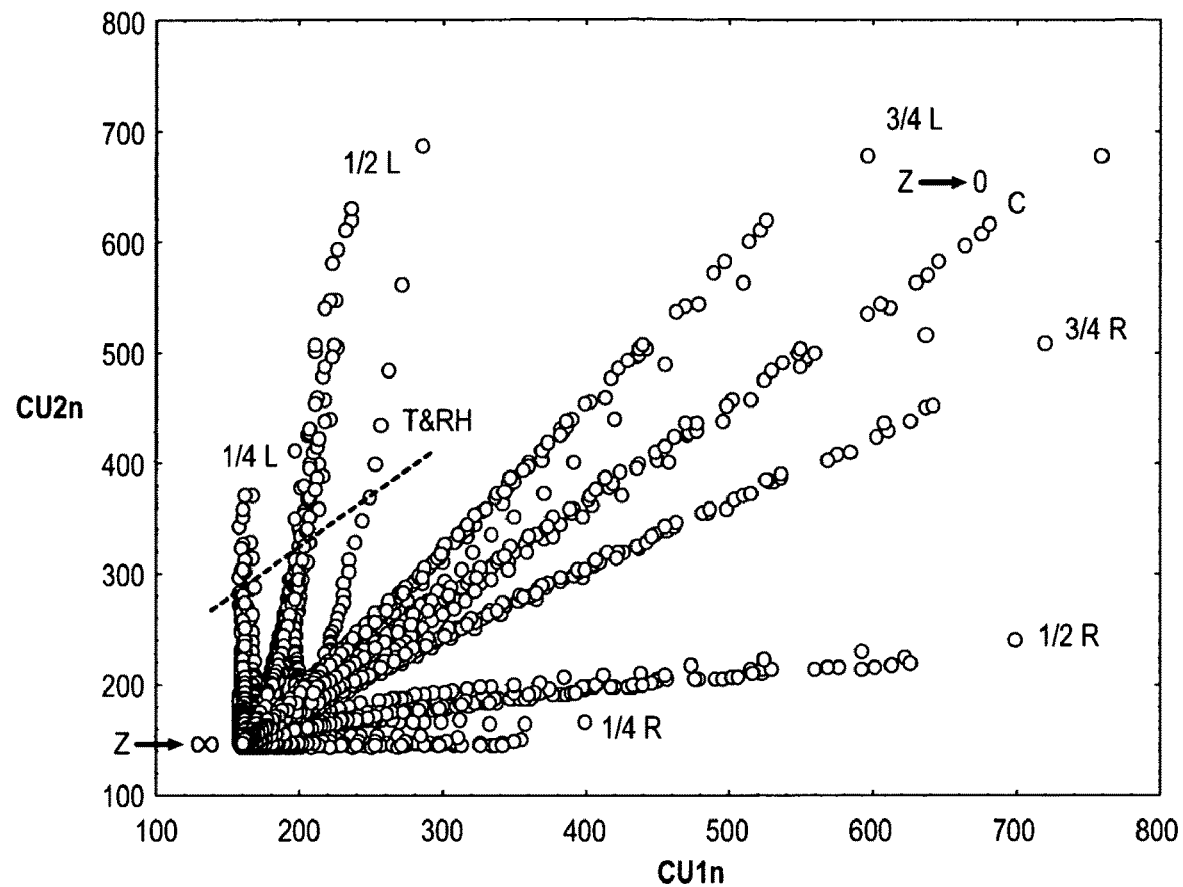
Figure 8B:
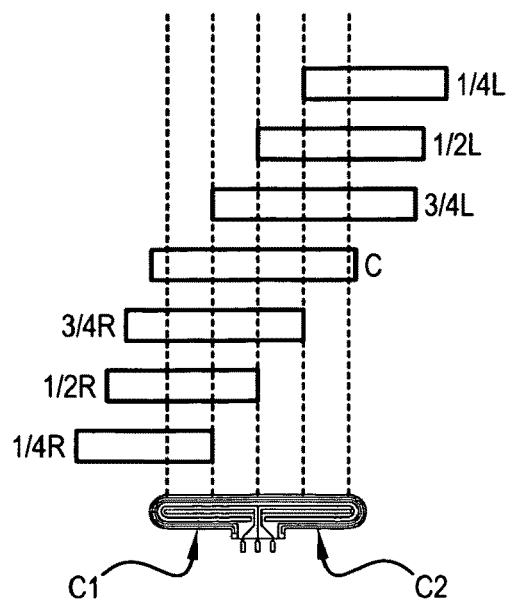
Figures 9A, 9B:
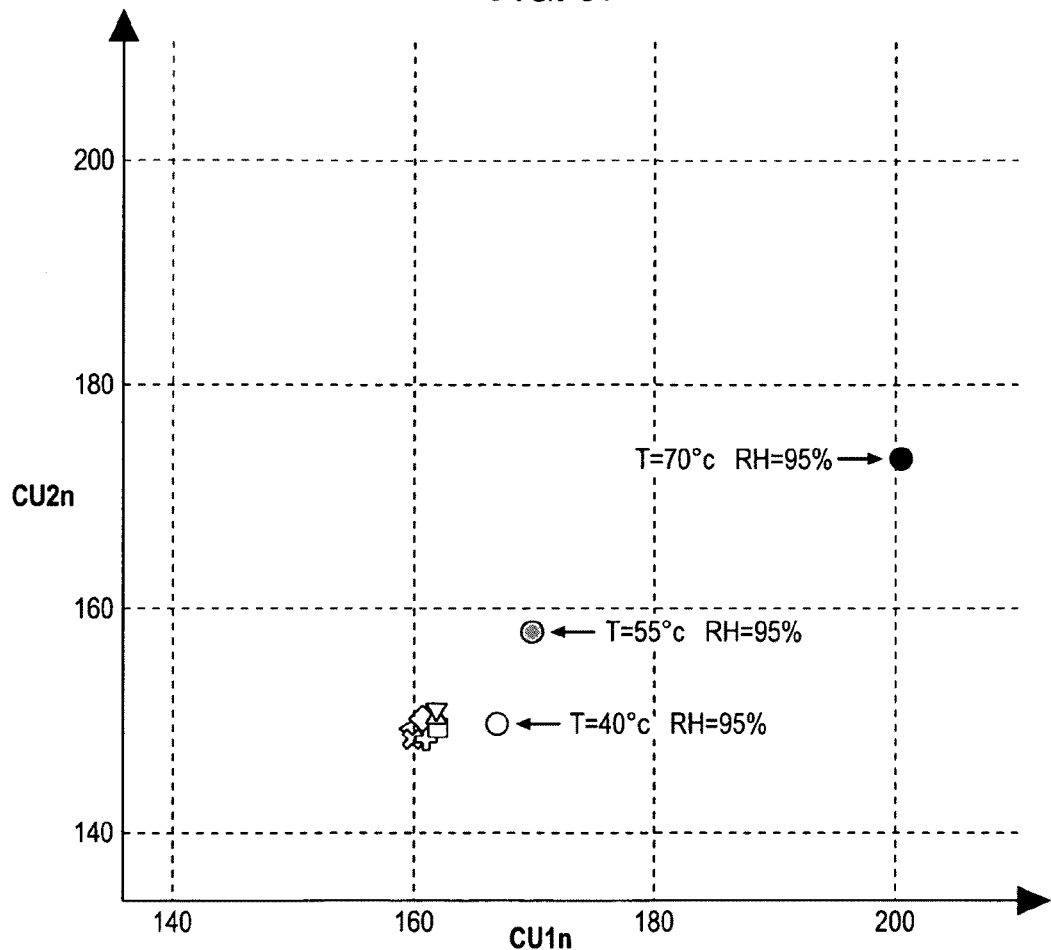
Figure 10:
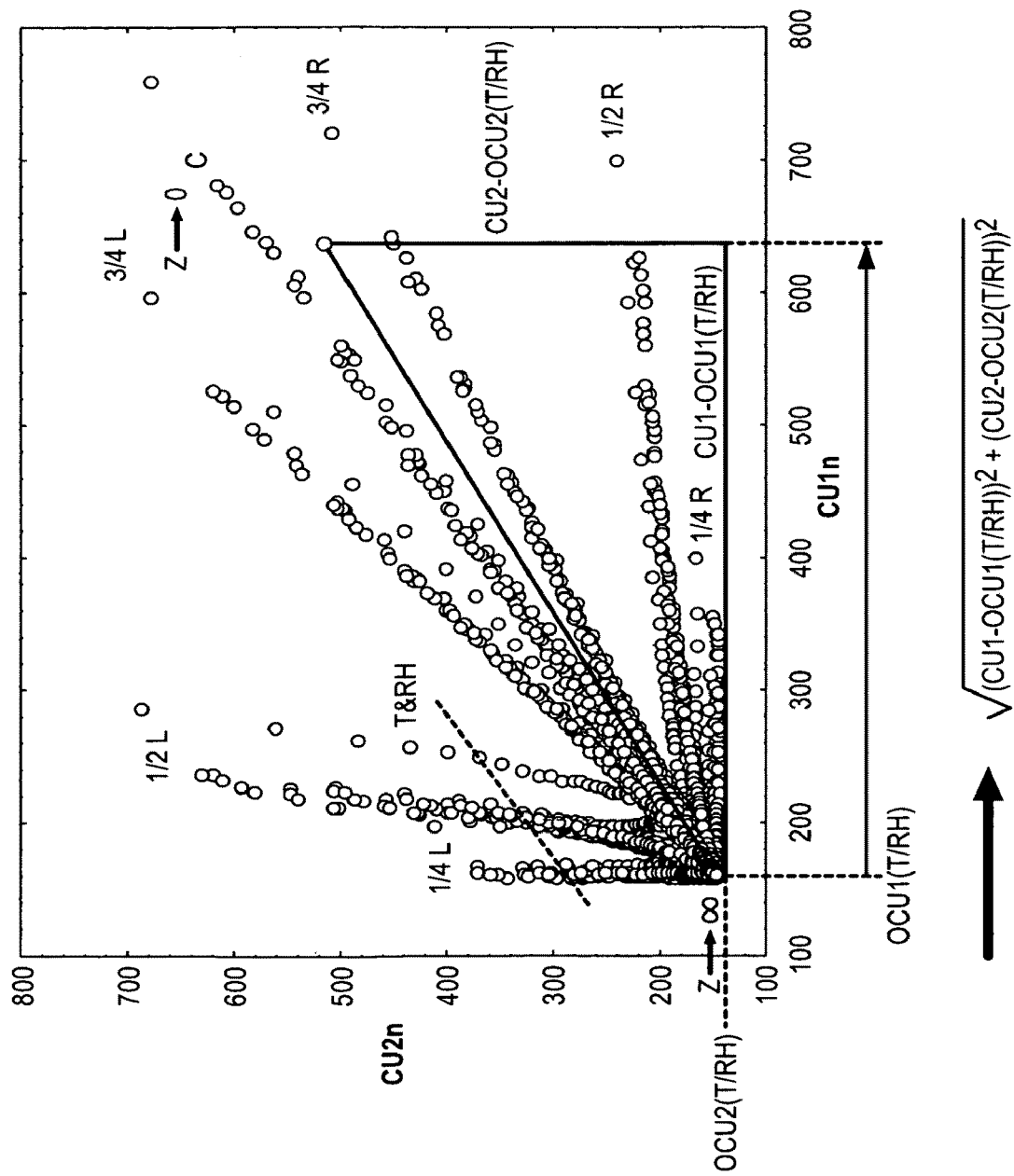
Figure 11:
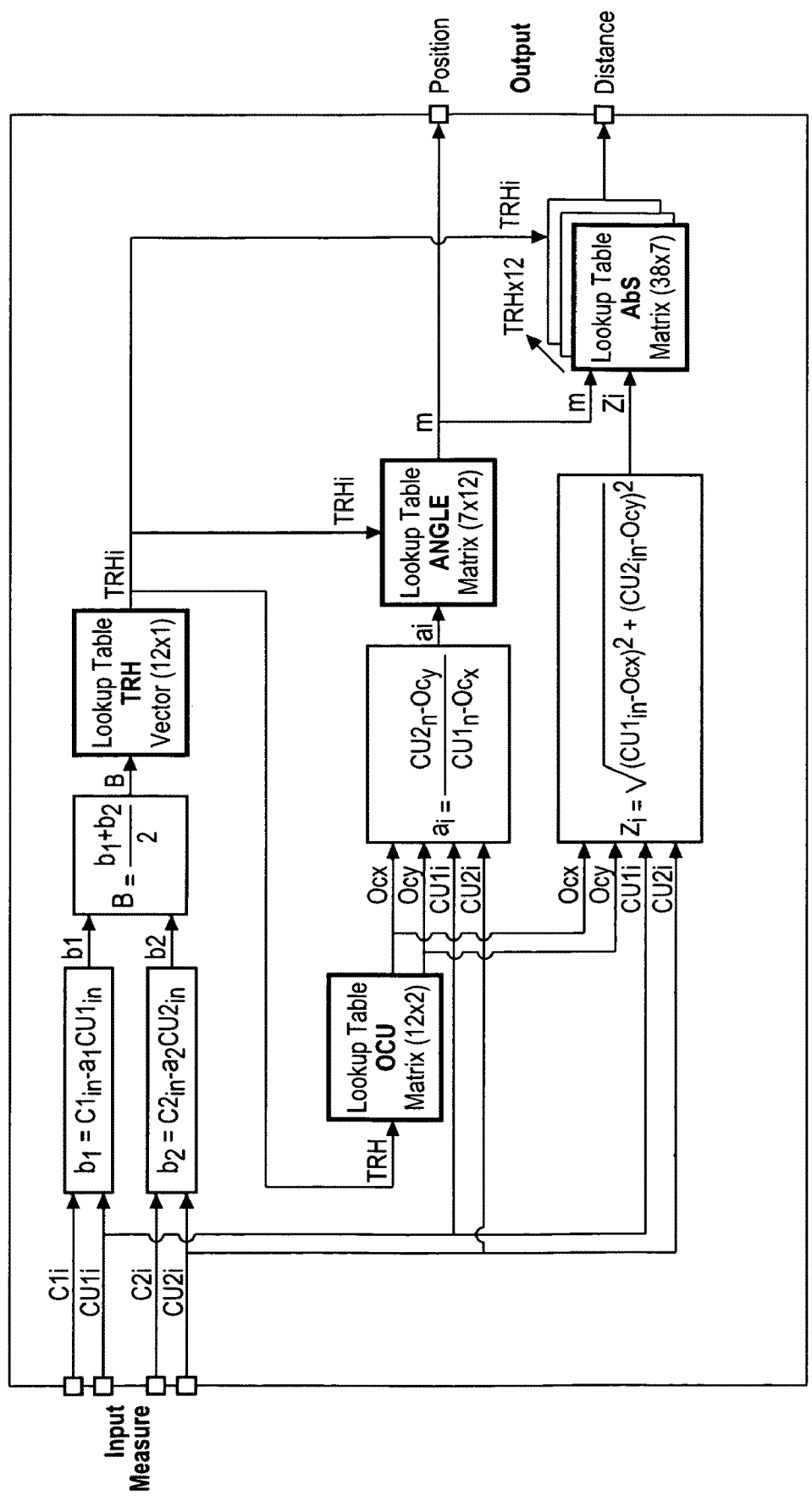
Figure 12:
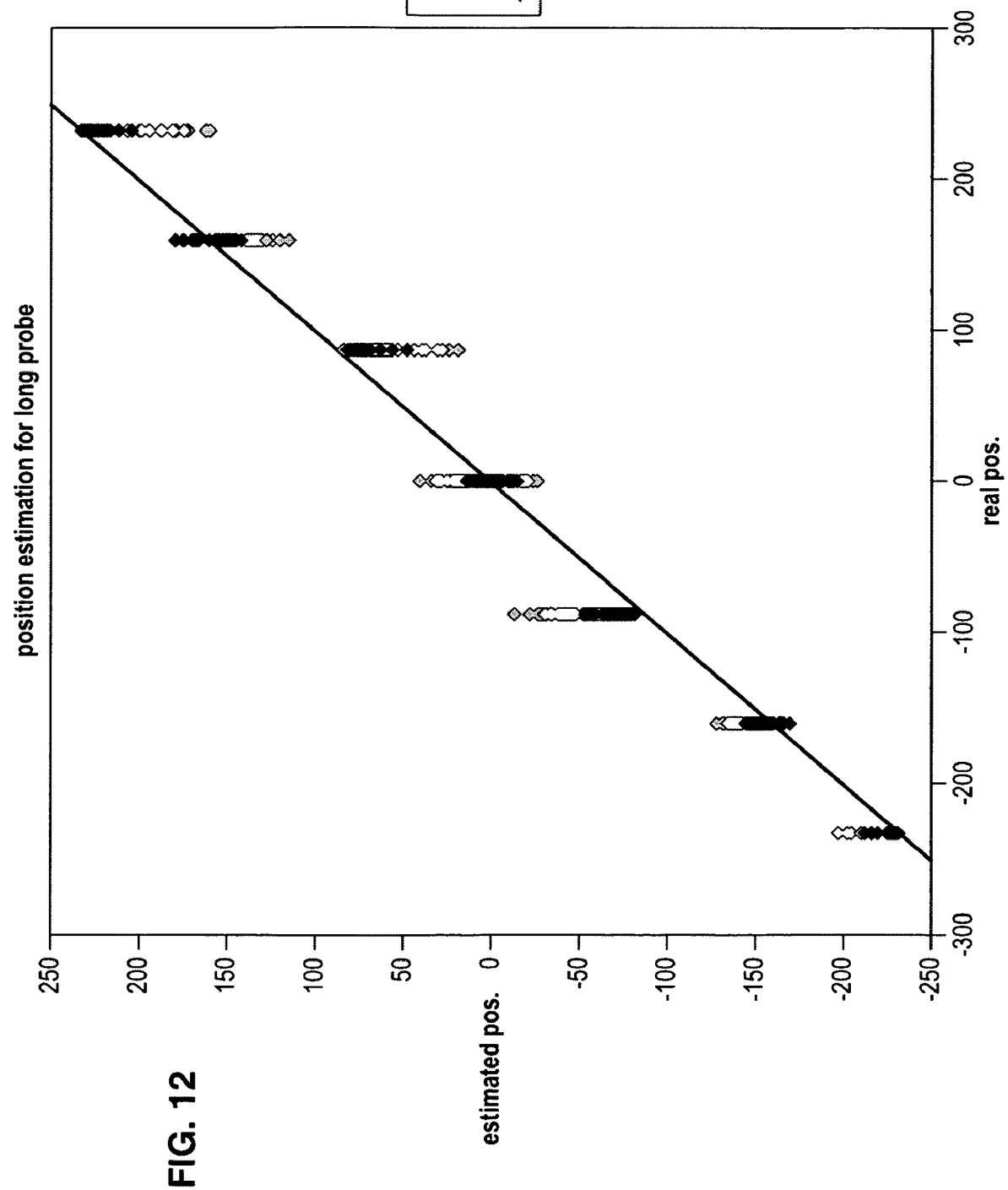
Figure 13:
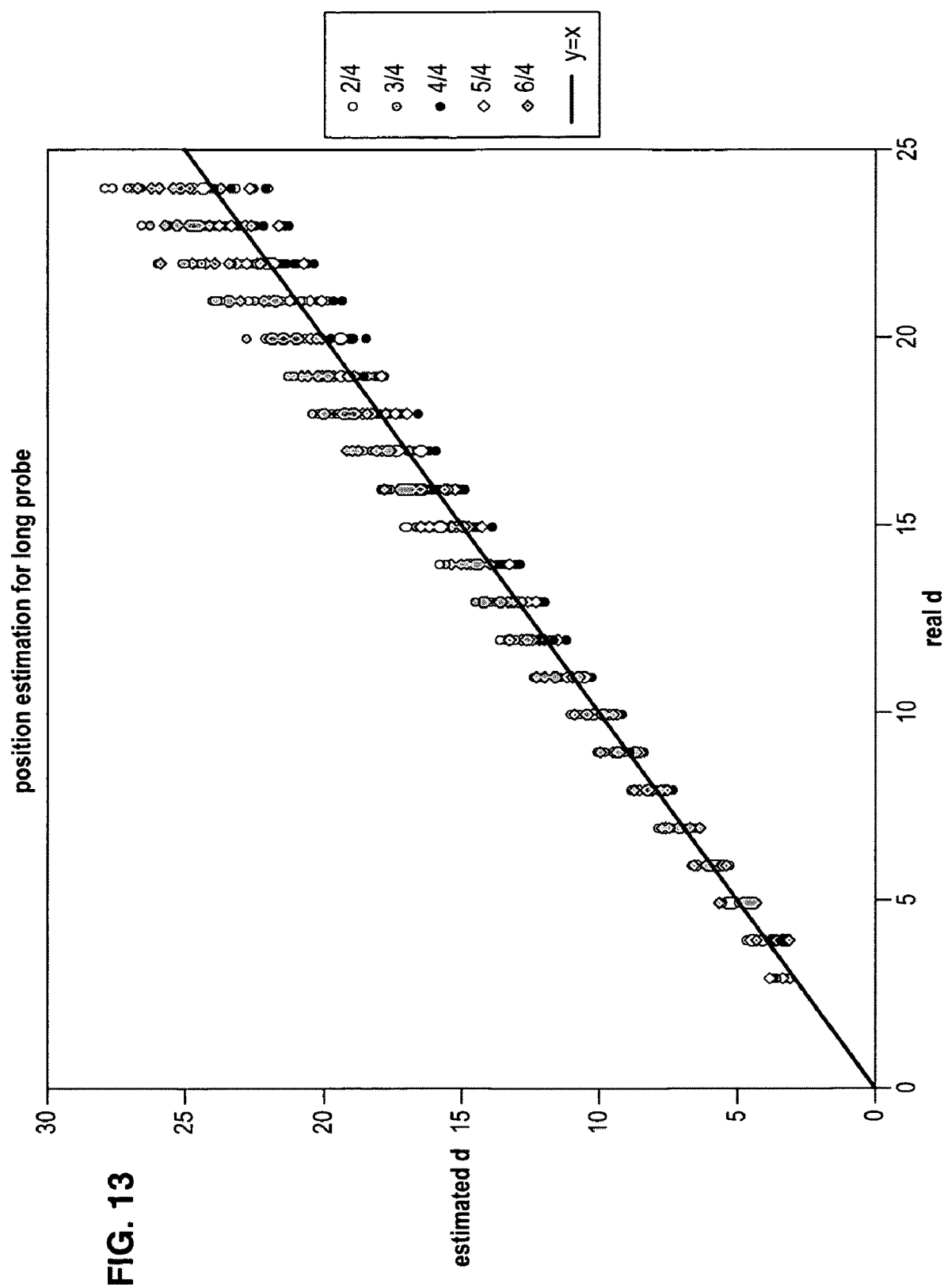
Figure 14:
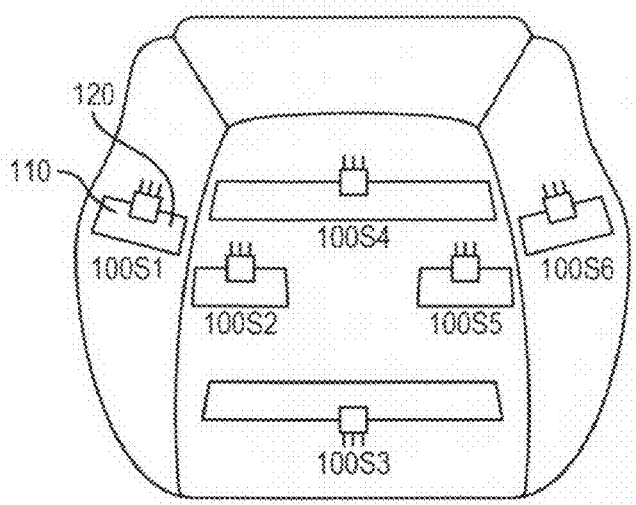
Figure 15:
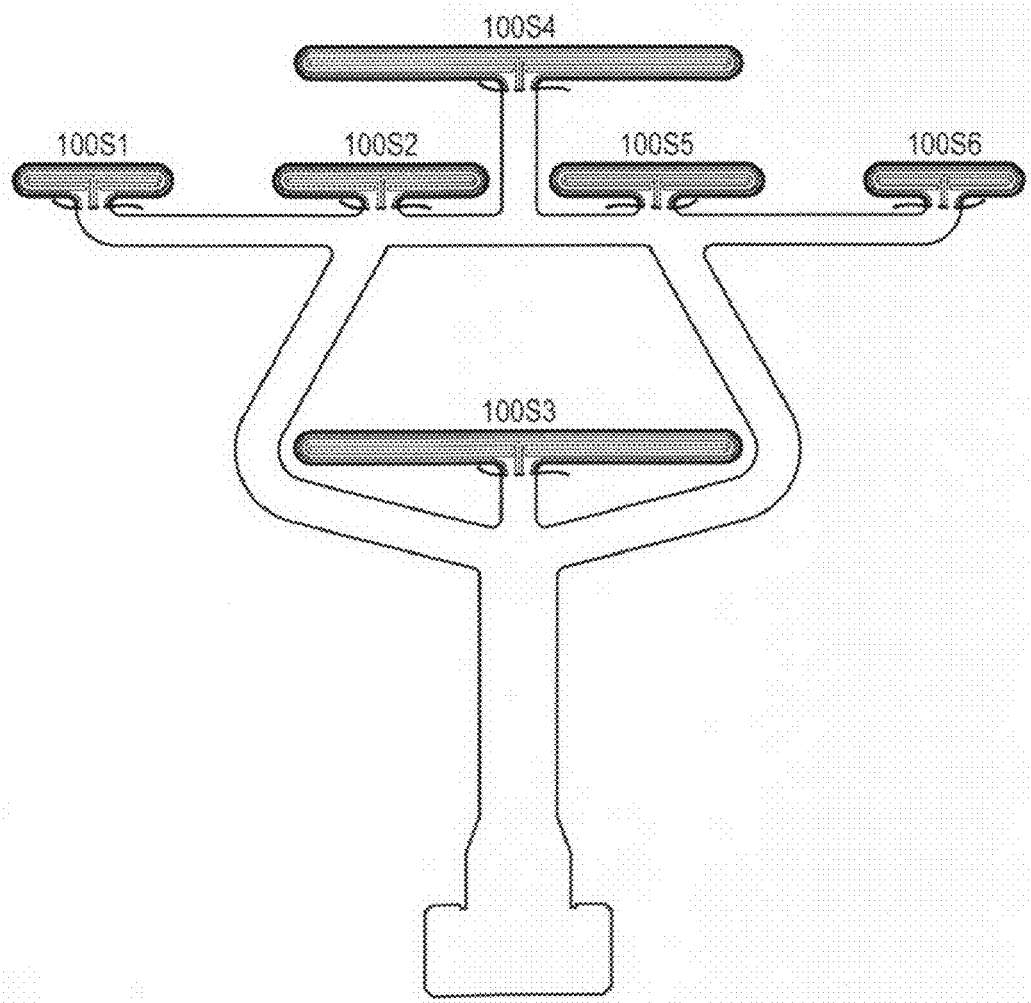
Figure 16:
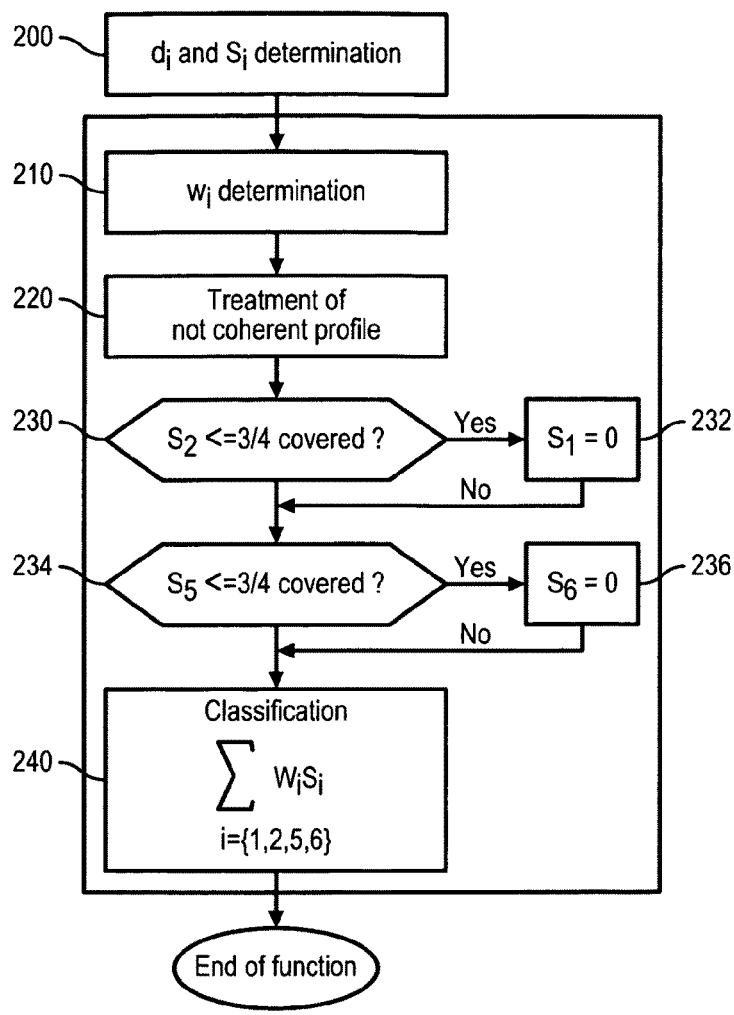
Figure 17:
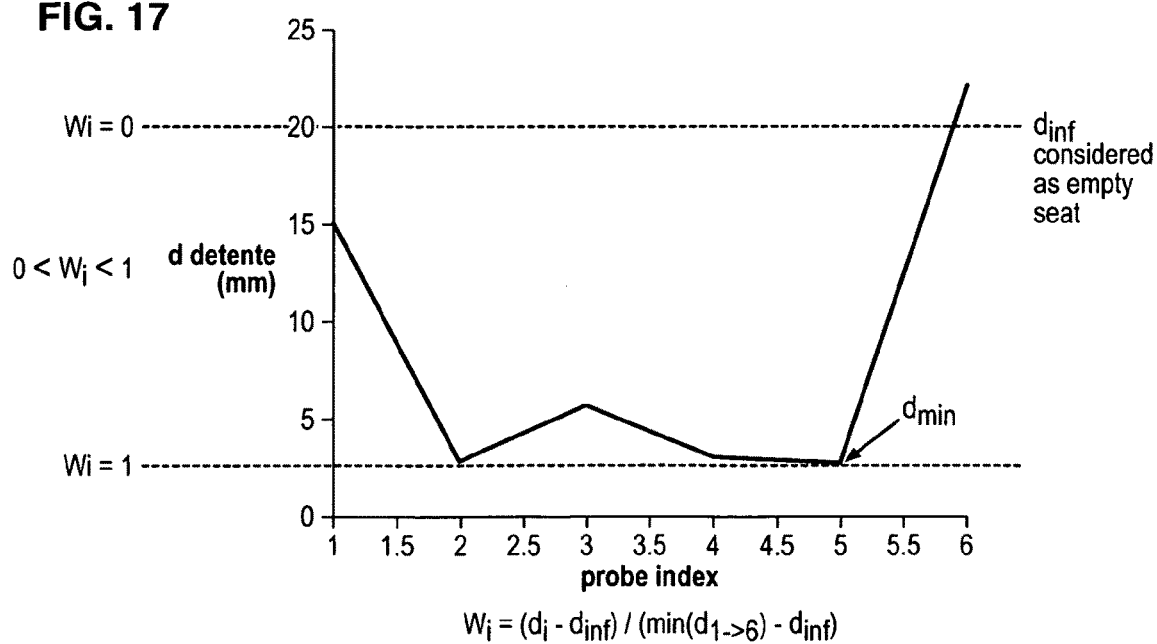
Figure 18:
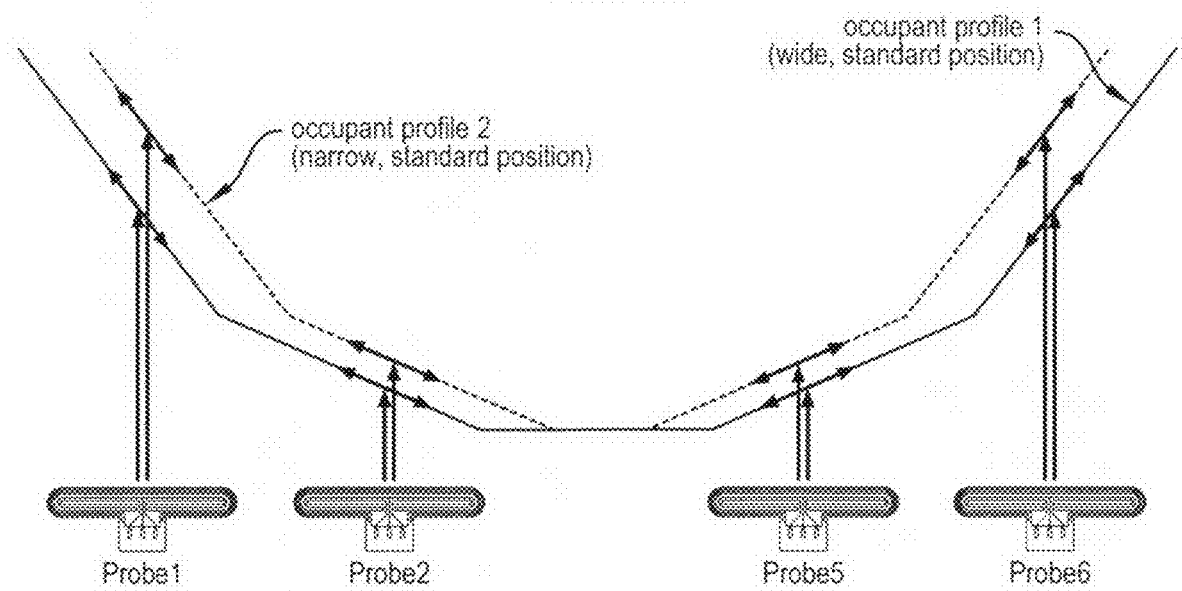
Figure 19:
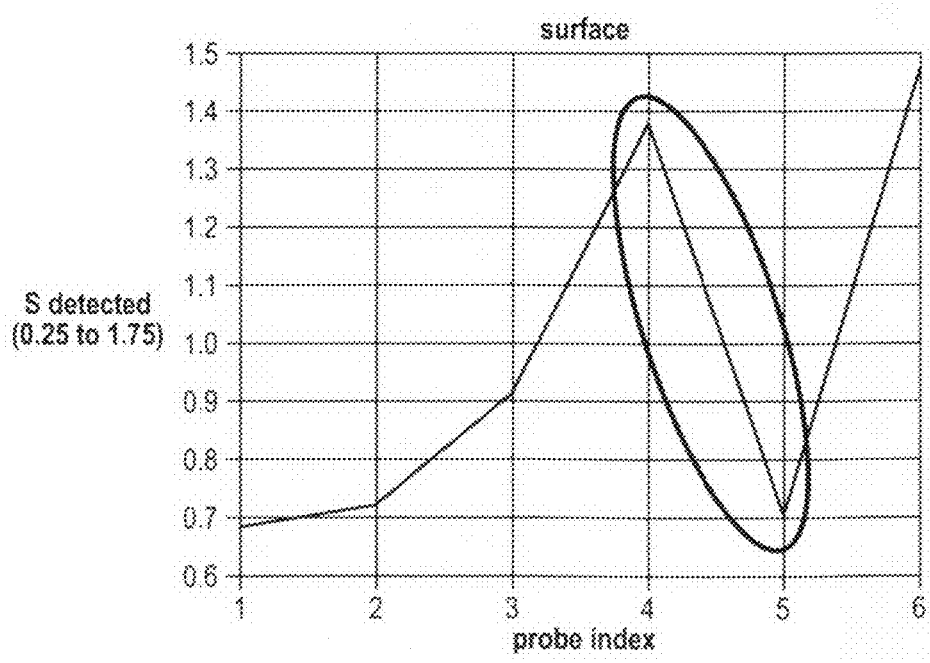
Figure 20:
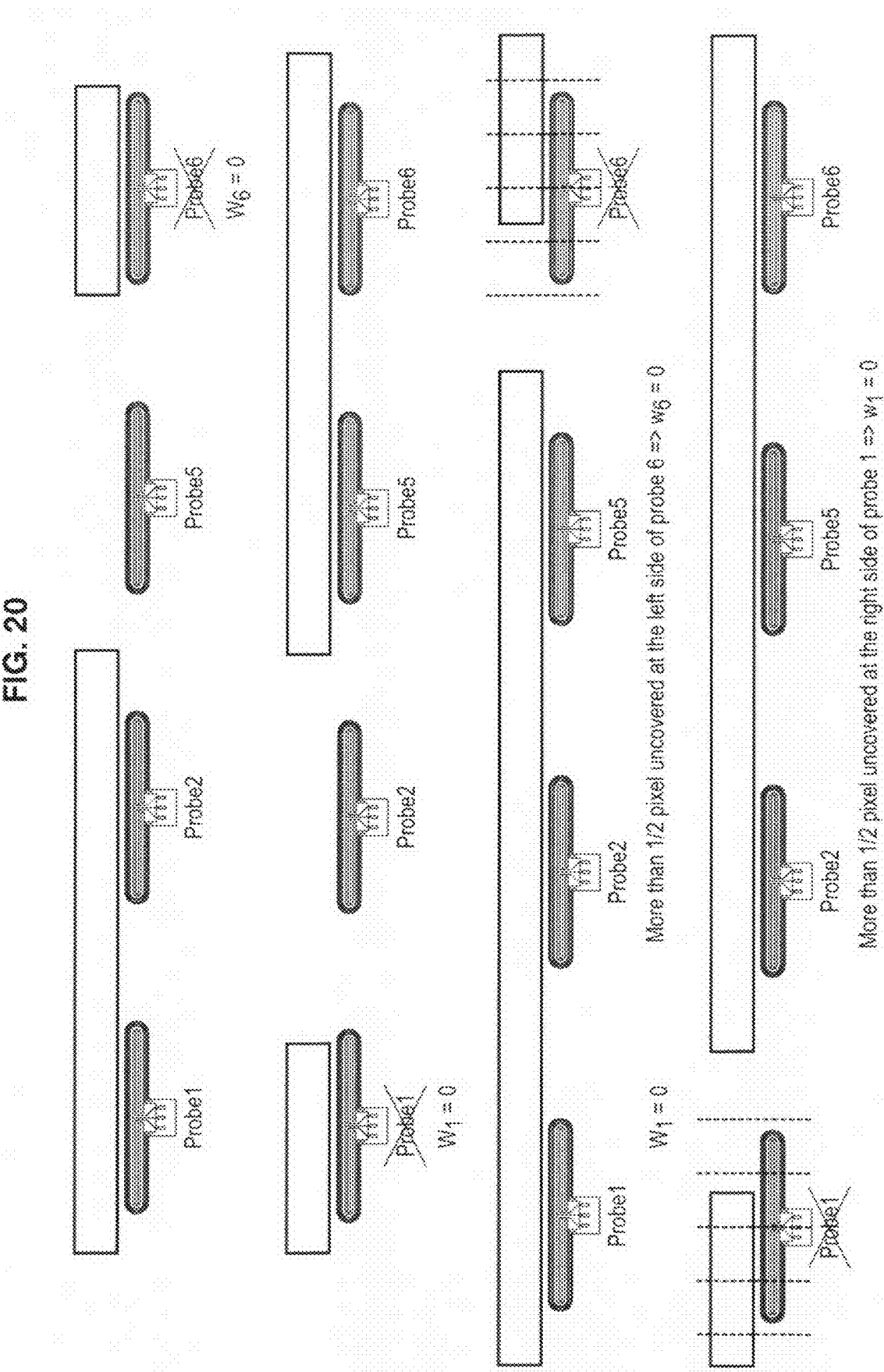
Figure 21:
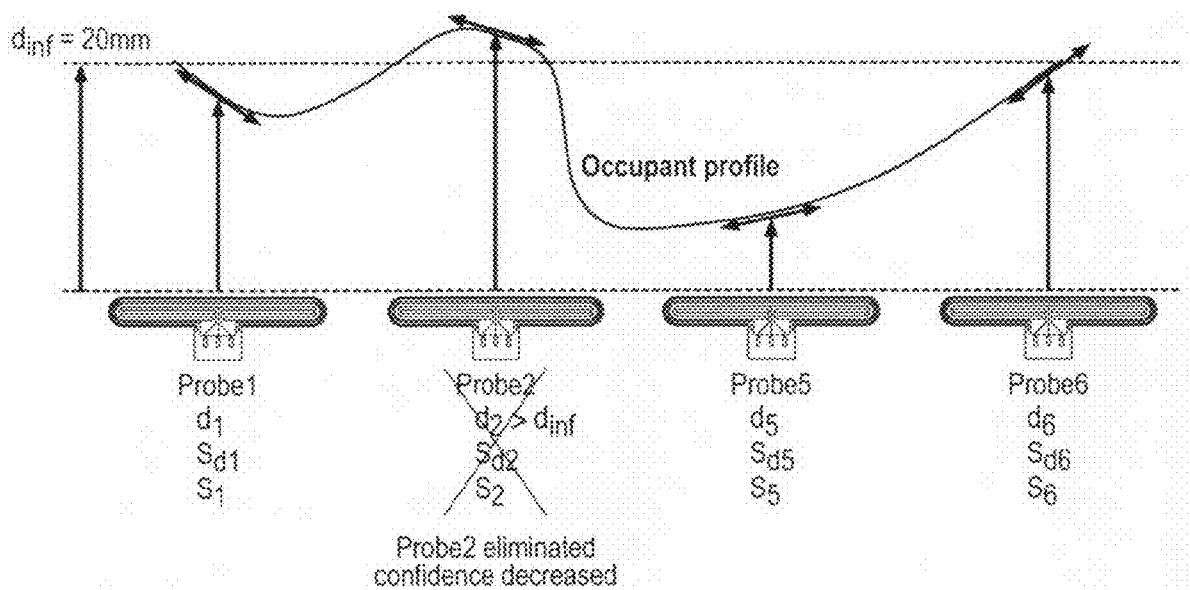
Figure 22:
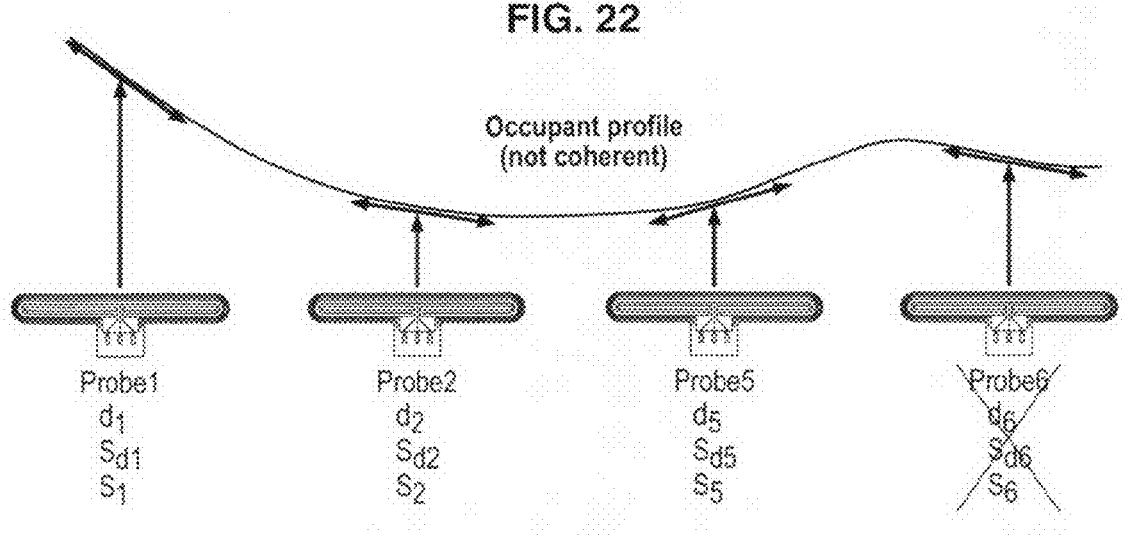
Figure 24:
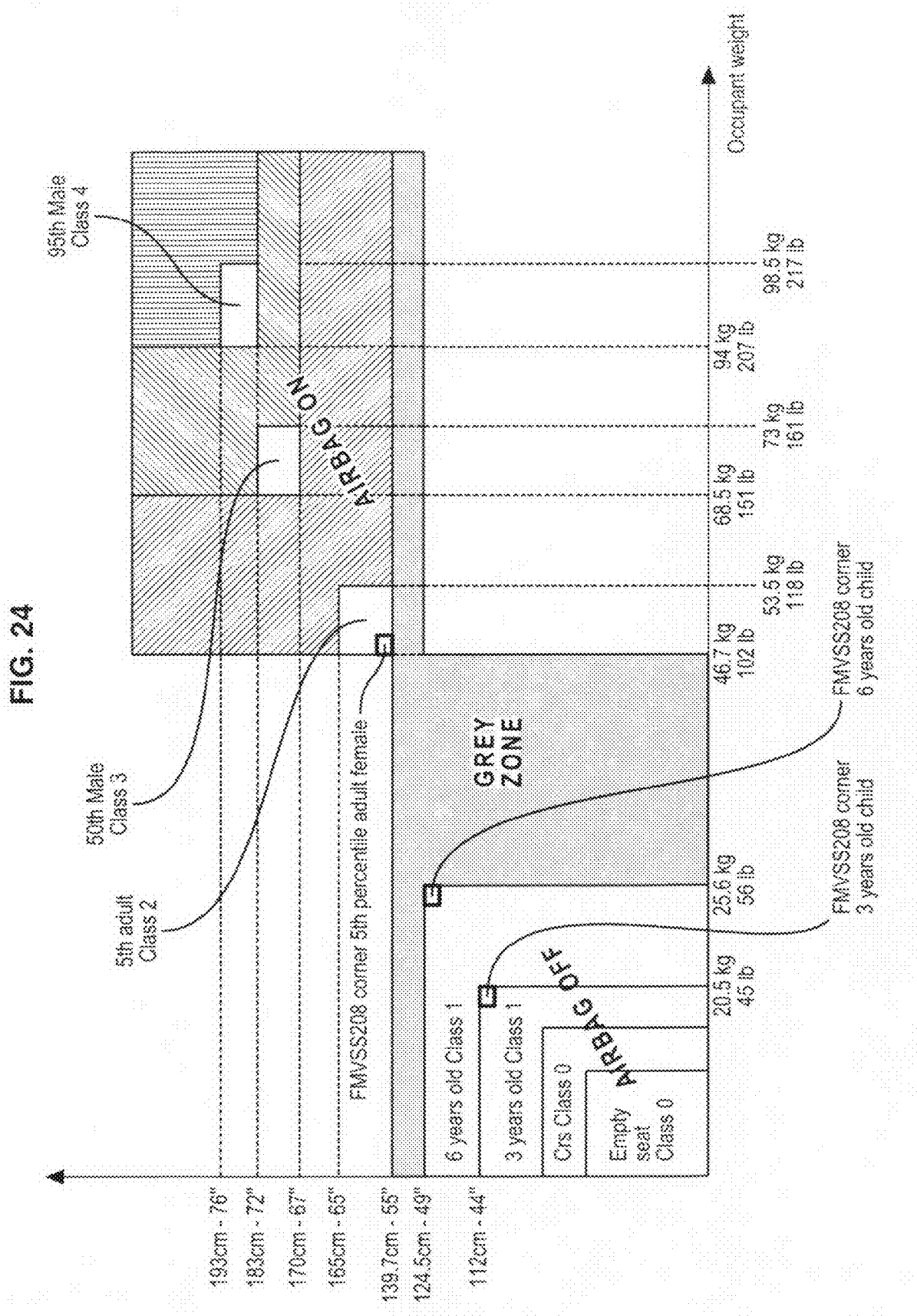
Figure 25:
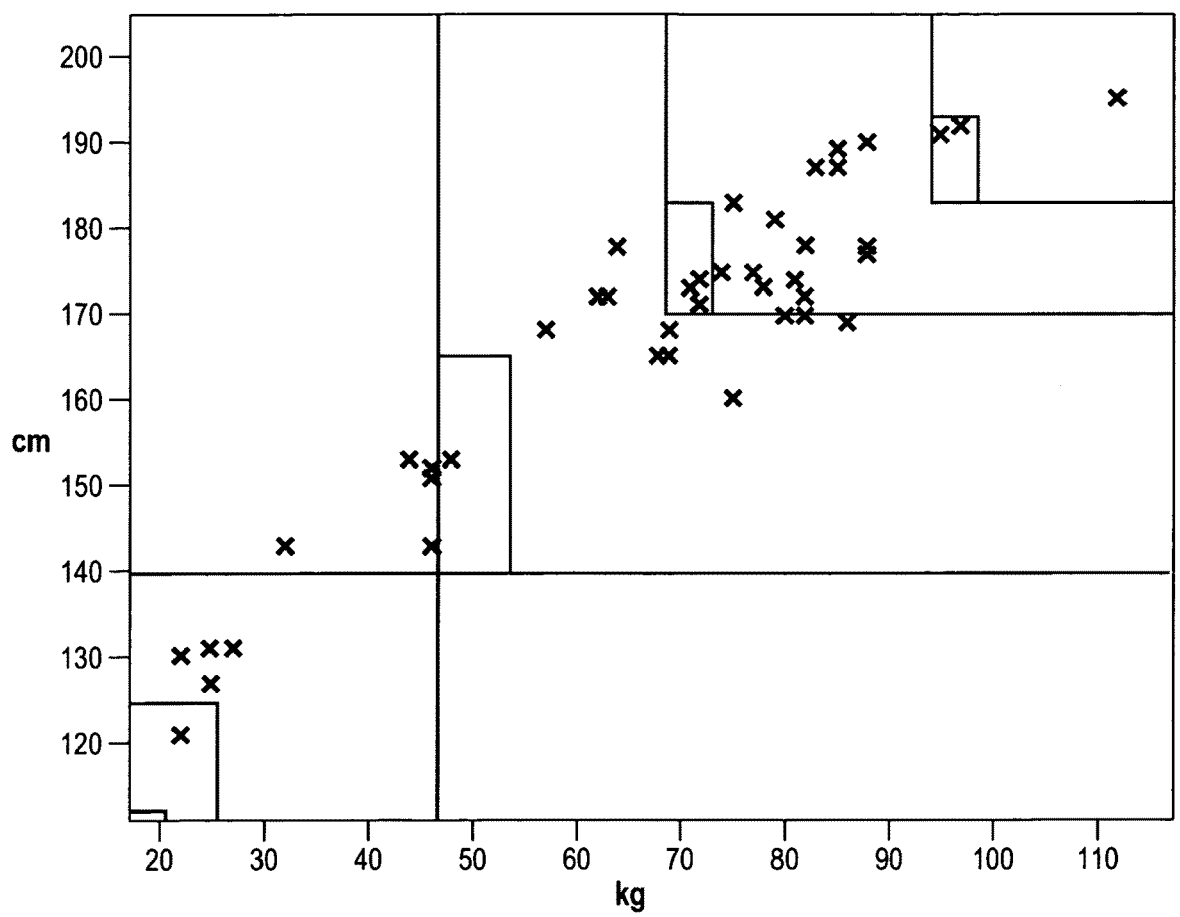
Figure 26A:
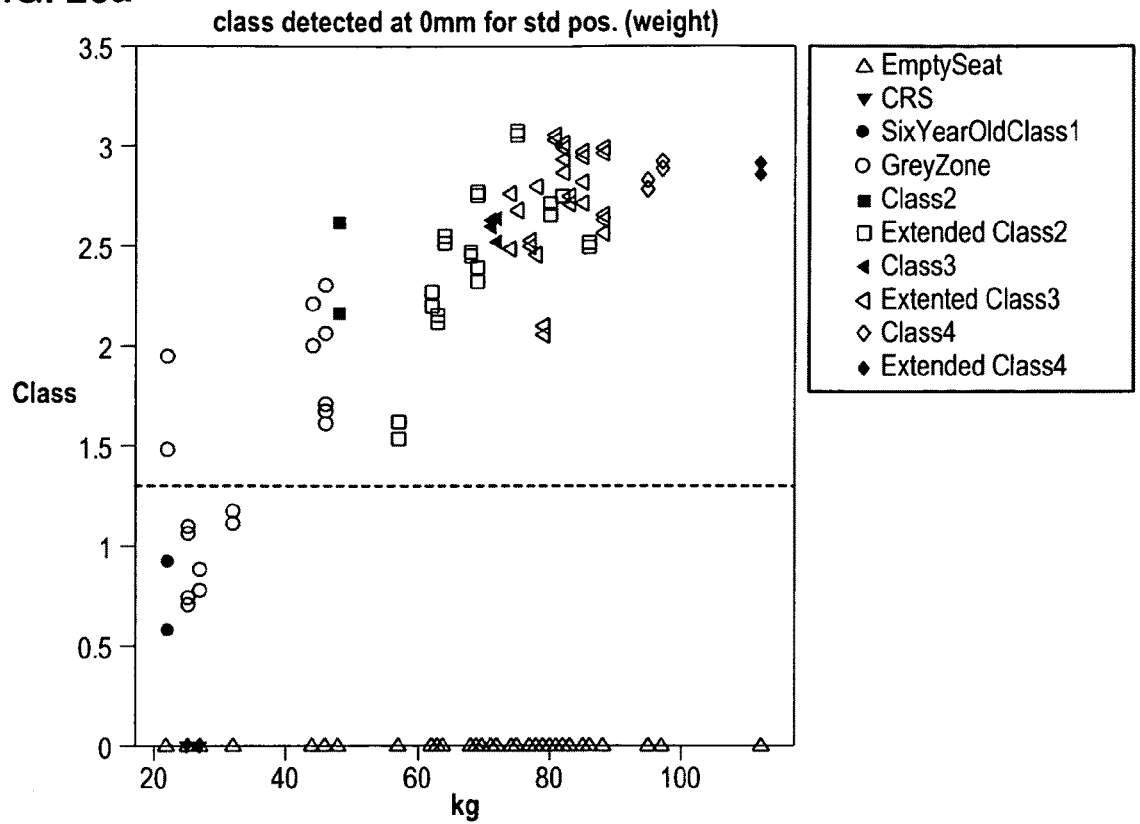
Figure 26B:
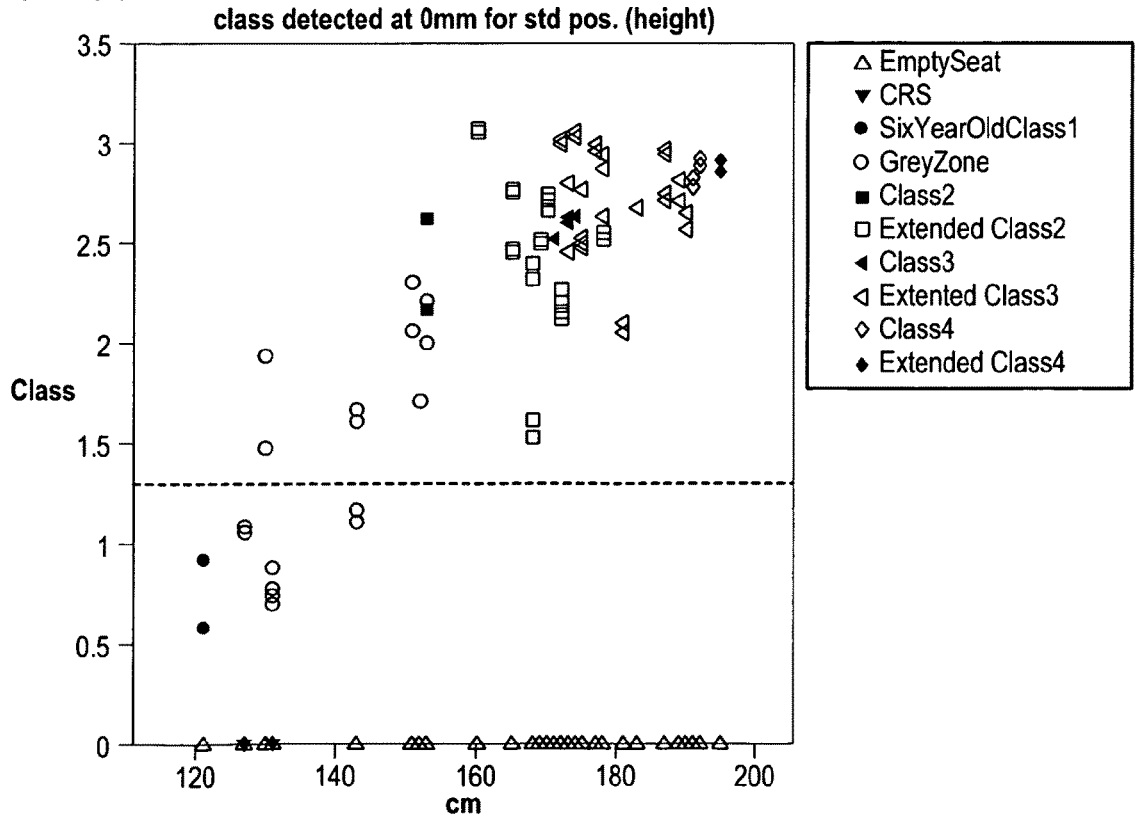
Figure 26C:
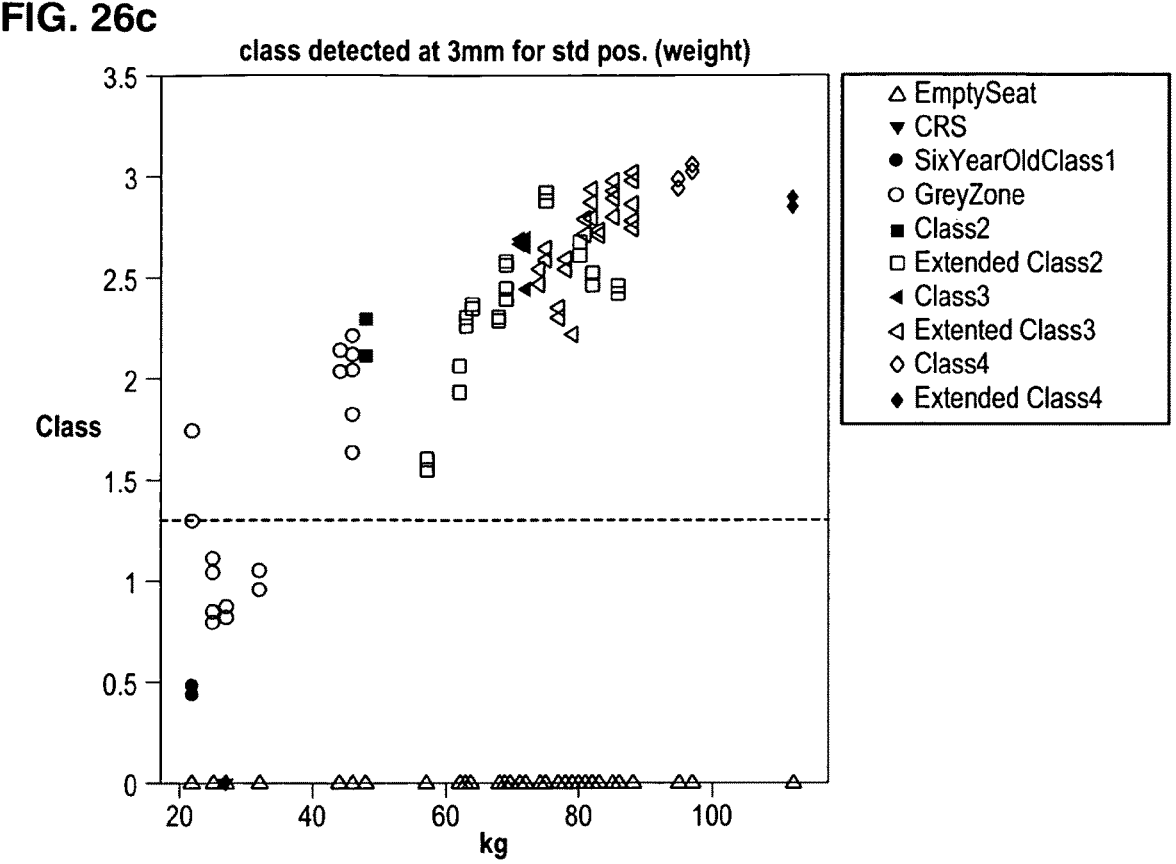
Figure 26D:
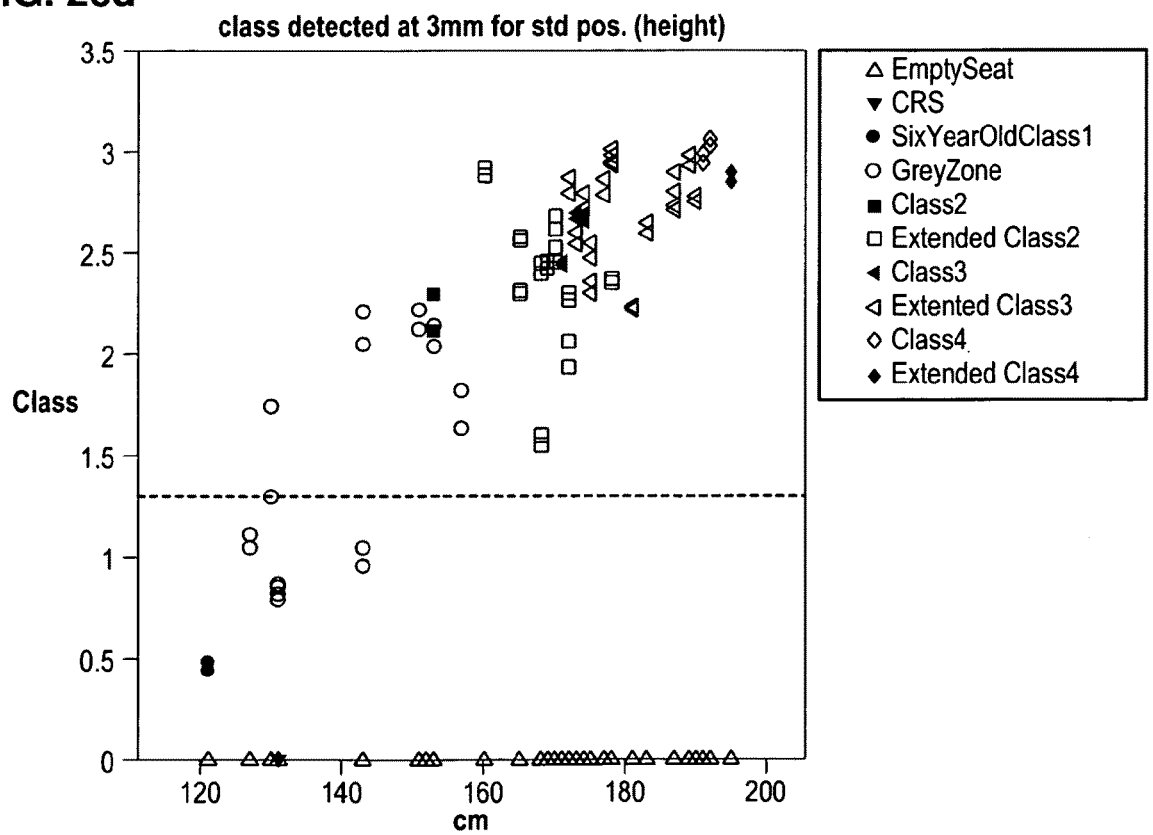
Figure 27:
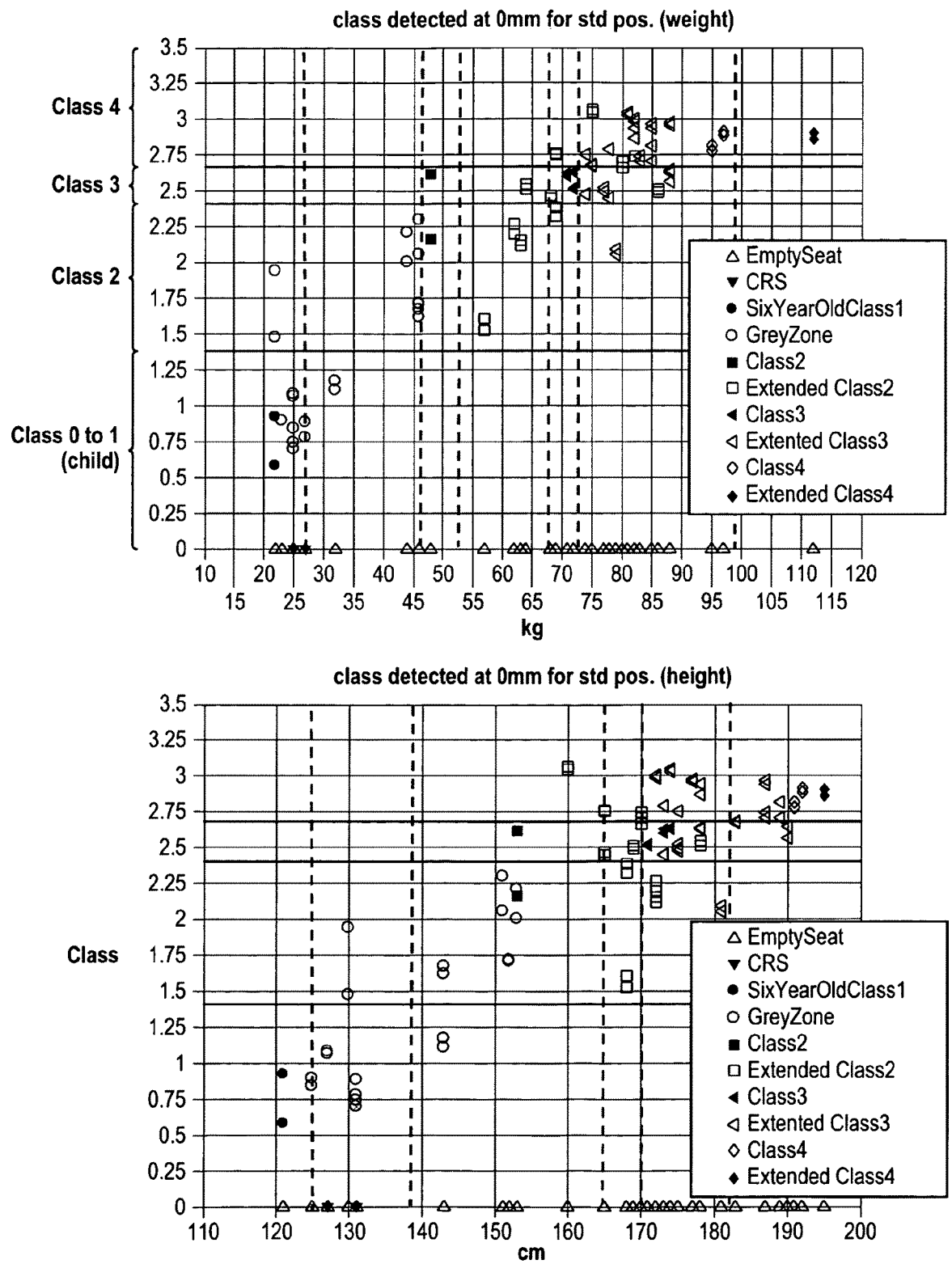
Figure 28:
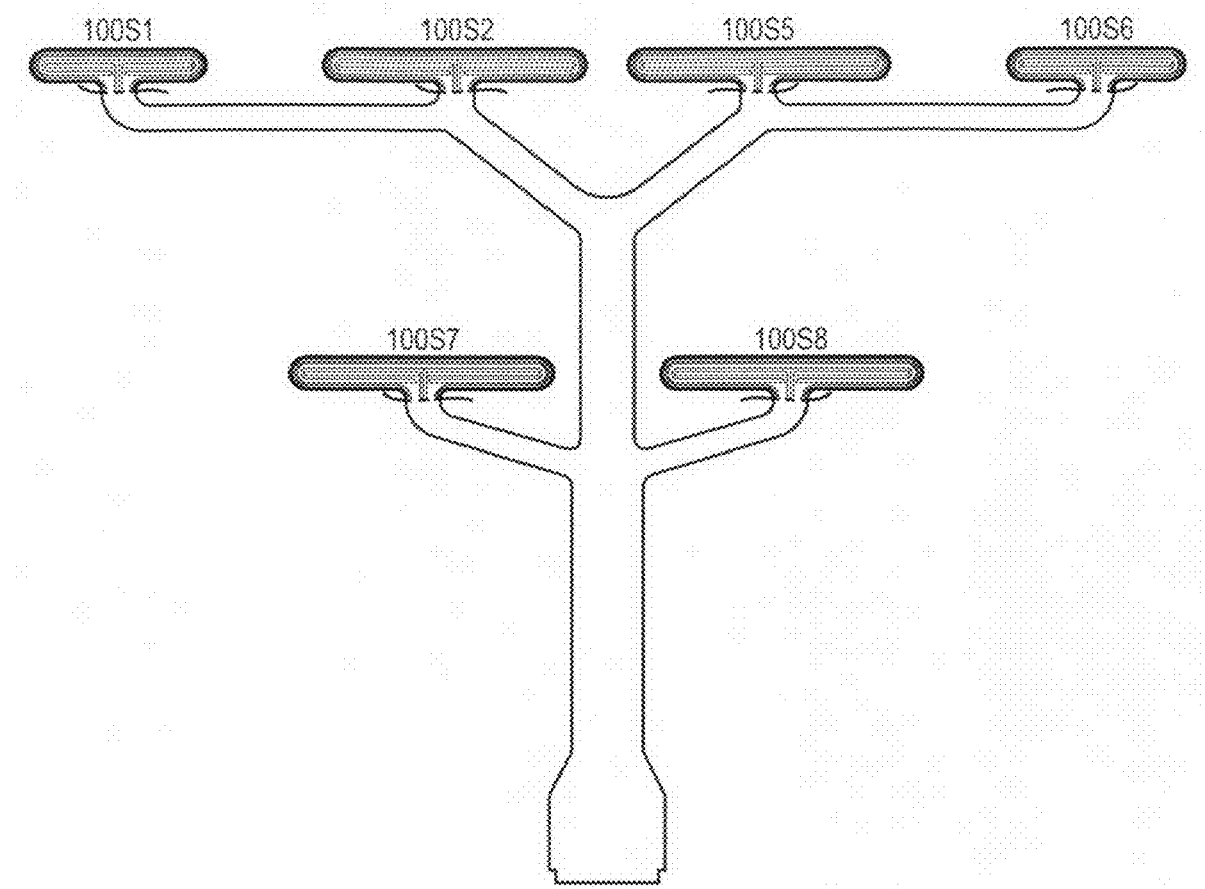
Figure 29:
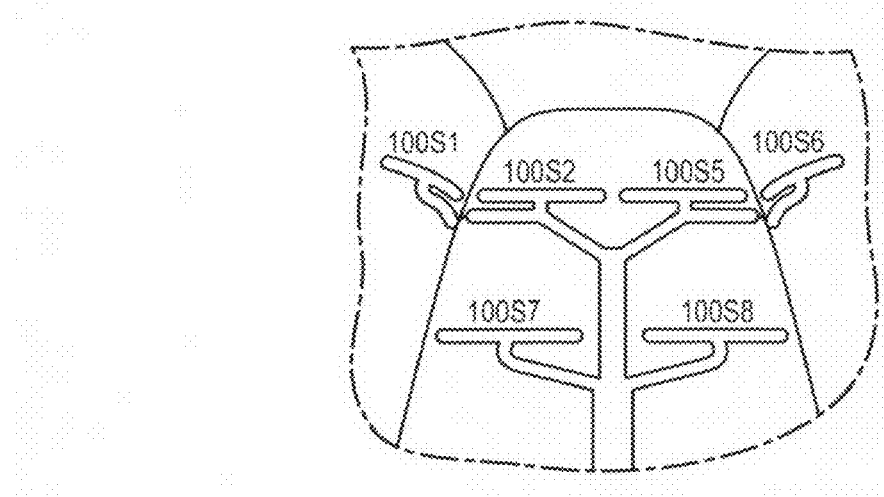
Figure 30:
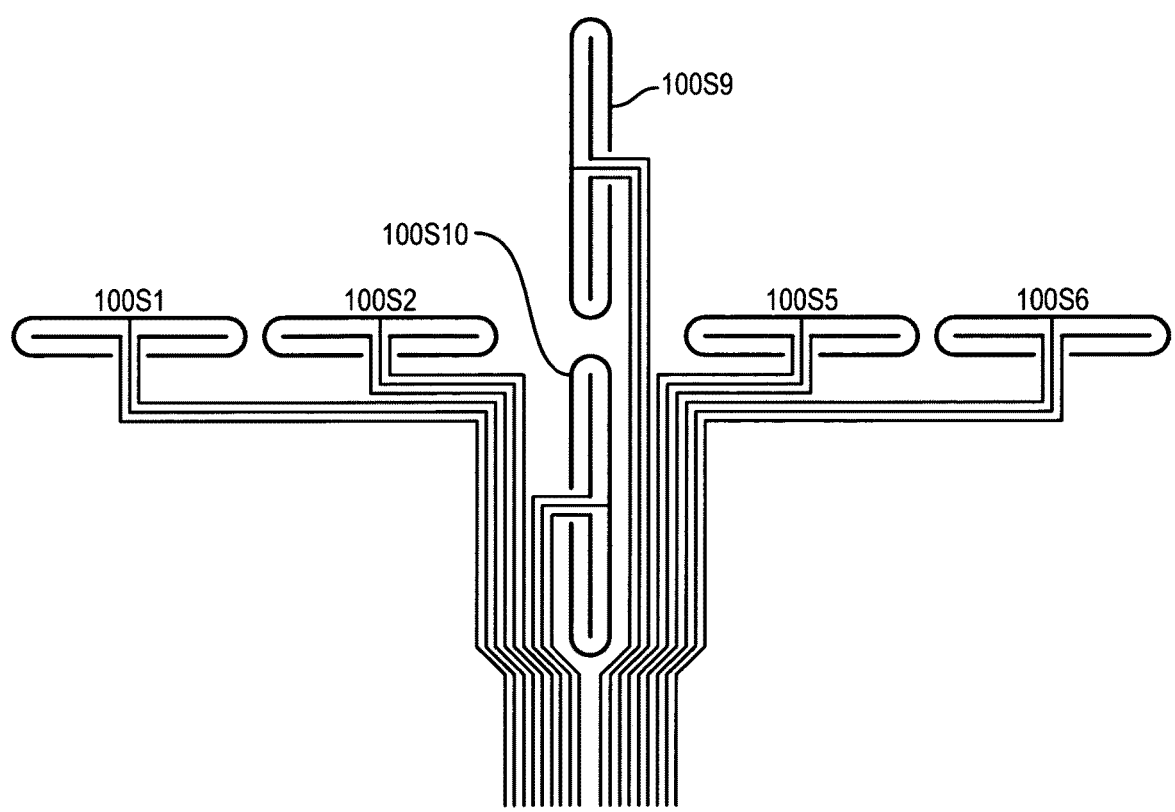

Other technical features, aims and advantages of the present invention will be understood from the following description which relates to the enclosed drawings wherein:

FIG. 1 illustrates a non limitative embodiment of a capacitive sensor according to the present invention, FIG. 2 illustrates an example of electrical potentials applied to the electrodes of said capacitive sensor during an initial step of a detecting prosecution in accordance with the present invention, FIG. 3 illustrates schematically the individual capacitive components operating in the sensor system of the present invention, FIG. 4 illustrates schematically the stepped displacement of a referenced target in regard of the sensor during a preparation part of the present invention, FIG. 5 illustrates schematically the relative, evolution of electrical outputs issued from the sensor in accordance with the present invention, which are used to determine parameters representative of the temperature and humidity, more precisely FIG. 5a illustrates curves CU1=f(C1), while FIG. 5b illustrates curves CU2=f(C2), FIG. 6 illustrates schematically the relative evolution of other electrical outputs issued from the sensor in accordance with the present invention, which are used to determine the distance separating the target from the sensor and/or the amount of the surface of the sensor covered by said target, FIG. 7 illustrates the construction of a look up table taking into account temperature and humidity parameters, more precisely FIG. 7a illustrates curves CU=f(C), FIG. 7b illustrates the definition of the origin of the curves and FIG. 7c illustrates the corresponding look up table, FIG. 8 illustrates the dependency of a relative evolution of electrical outputs issued from the sensor with the relative position of a reference target in regard of the sensor, more precisely FIG. 8a illustrates curves CU2=f(CU1) while FIG. 8b illustrates a sequence of relative displacements of the reference target in regard of the sensor, FIG. 9 illustrates the construction of a look up table determining an initial offset of curve responses in relation with temperature and humidity parameters, more precisely FIG. 9a illustrates some points of curves CU2=f(CU1) while FIG. 9b illustrates the corresponding look up table, FIG. 10 illustrates the determination of the distance separating a target from the sensor on the basis of the combination of outputs issued from the capacitive sensor, FIG. 11 illustrates schematically the complete detection method in accordance with the present invention, FIG. 12 illustrates the performance of the present invention in determining the amount of the surface of the sensor covered by said target, FIG. 13 illustrates the performance of the present invention in determining the distance separating the target from the senso, FIG. 14 illustrates schematically the implantation of 6 capacitive sensors on a seat in conformity with an embodiment of the present invention, FIG. 15 illustrates schematically the corresponding array of sensors, FIG. 16 illustrates schematically the main steps of the method in accordance with the present invention, FIG. 17 illustrates schematically an example of evolution of the measured distance from one sensor to the other, FIG. 18 illustrates schematically two variants of position of occupant on a seat of car, FIG. 19 illustrates on a curve, an example of partial rejected output due to incoherence, FIG. 20 illustrates four other examples of partial outputs rejected for incoherence, FIGS. 21 and 22 illustrate schematically two other cases of partial rejected outputs, FIG. 23 illustrates a Table providing an example of coherence analysis, FIG. 24 illustrates an official regulation, FIG. 25 illustrates a corresponding sample base, FIG. 26 illustrates a data base obtained with the method in accordance with the present invention, FIG. 27 illustrates an example of thresholds applied to such a data base, FIG. 28 illustrates a second variant of implantation of capacitive sensors in accordance with the present invention, FIG. 29 illustrates the same variant of sensors provided on a seat, and FIG. 30 illustrates another variant of implantation of capacitive sensors in accordance with the present invention.

As indicated above, the present invention proposes a method for determining the morphology of an occupant in an automotive seat. The present invention allows in particular to control airbag triggering in function of such determined morphology.

More precisely as indicated above the present invention proposes a method comprising the steps of collecting the outputs of a plurality of capacitive sensors 100 provided on a seat, determining for each capacitive sensors 100 a first value di representative of the distance separating a target 10 from the sensor 100 and a second value Sdi representative of the surface of the sensor 100 covered by the target 10, applying to the second values Sdi representative of the surface of the sensor 100 covered by the target 10 a respective weighting Wi based on the corresponding first value di representative of the distance separating the target 10 from the same sensor 100, and determining the morphology of the target 10 on the basis of the collection of weighted second values SdixWi.

The distance di separating the target 10 and each sensor 100 and the surface Sdi of the target 10 covering each sensor 100, may be obtained by any efficient means.

According to the present invention such distance di separating the target 10 and each sensor 100 as well as the surface Sdi of the target 10 covering each sensor 100 are preferentially obtained with a method which includes means for compensating drifts caused by temperature and humidity environment. Indeed the inventors have uncovered that generally capacitive measures are very sensitive to temperature and humidity environment.

In the following description we will first describe a preferential and non limitative method to obtain the distance di and the surface Sdi, and we will describe in a second time the method in accordance with the present invention to determine the morphology of an occupant on the basis of such distance di and surface Sdi.

A. Determination of Distance di Separating a Target from Each Sensor and of Surface Sdi of the Target Covering Each Sensor.

The present invention uses a capacitive sensor structure 100.

This capacitive sensor 100 may be in conformity with a plurality of embodiments.

Preferentially the capacitive sensor 100 of the present invention comprises at least two electrodes 110, 120, in conformity with the disclosure of French patent application 05 08072, covering complementary respective areas of a sensed zone so as to form two balanced pixel sensors. The function of such two electrodes 110, 120 and corresponding balanced pixel sensors will be described more in detail in the following specification.

Preferentially the capacitive sensor 100 of the present invention comprises 3 electrodes 110, 120, 130 as illustrated on FIG. 1, in conformity with the general disclosure of French patent application 05 08072. Of course the present invention is not limited to the specific embodiment and shape illustrated on FIG. 1.

The two electrodes 110 and 120 correspond to main electrodes. They cover complementary respective areas of a detection or sensed zone. More precisely the two main electrodes 110 and 120 are preferentially made of rectilinear tracks. The two main electrodes 110 and 120 are preferentially aligned. Preferentially the two main electrodes 110 and 120 have the same surface. However the present invention may be implemented with main electrodes 110, 120 having non identical surfaces, taking into account the ratio between the respective surfaces of the two main electrodes 110 and 120 in the detecting prosecution.

The third auxiliary electrode covers at least substantially both the two complementary respective areas of the two main electrodes 110 and 120. More precisely as illustrated on FIG. 1, preferentially the third electrode 130 surrounds said two main electrodes 110 and 120.

The third electrode 130 is connected at its middle part to a transverse connecting track 132. Similarly the two main electrodes 110 and 120 are connected at their adjacent ends to transverse respective connecting tracks 112 and 122.

Such a sensor 100 comprising only 3 outputs 112, 122 and 132 may deliver a number of output information greater than 3, corresponding to capacitor values depending of the connection of said electrodes 110, 120 and 130. French patent application 0508072 for example discloses the implementation of 8 output information from similar electrodes 110, 120 and 130.

These capacitor values are measured by applying judiciously an electric controlled dc field between some electrodes 110, 120, 130 and subsequently measuring and counting up electric charges on dedicated electrodes 110, 120, 130, after breaking said electric dc field.

These electric charges can be converted in voltage for example but not restrictively by using the means according to arrangement defined in document WO-A-00/25098.

In other words preferentially the present invention method converts the electric charges accumulated on a selected electrode 110 or 120, into an electric output signal, with supplying means suitable to apply a controlled dc electrical voltage on selected electrodes, integrator means including a capacitive switching system and control means-suitable to define cyclically, at a selected frequency, a sequence of two following steps:
   a first step wherein the supplying means are connected to at least one electrode so as to apply an electric field on this electrode and to accumulate electric charges on this electrode,
   and a second step wherein the supplying means are not connected to the selected electrode, and this selected electrode is connected to the input of the integrator means to transfer the electrical charges into the integrator means.

More precisely although the disclosure of French patent application 0508072 recommends to use 8 combinations of measurements from a similar sensor, the present invention implements preferentially only 4 combinations of measurements upon the sensor. Indeed the inventors have uncovered that such 4 combinations are sufficient to localise precisely the target in view of the sensor. These 4 combinations which are schematically illustrated on FIG. 2 wherein Vf corresponds to an electric dc potential and G corresponds to ground (0 volt) potential, are listed here after:
(1) Phase C1 get with the following way:
   Application of Vf on electrodes 110 and 120, and of G on electrode 130.
   Removal Vf from electrodes 110 and 120 and G from electrode 130.
   Put electrodes 110, 120 and 130 in high impedance state (totally left open) in order to keep all charges trapped in electrodes.
   Count up the charges trapped on electrode 110. This result is called C1
(2) Phase CU1 get with the following way:
   Application of Vf on electrodes 110, 120 and 130.
   Removal Vf from electrodes 110, 120 and 130.
   Put electrodes 110, 120 and 130 in high impedance state (totally left open) in order to keep all charges trapped in electrodes.
   Count up the charges trapped on electrode 110. This result is called CU1.
(3) Phase C2 get with the following way:
   Application of Vf on electrodes 110 and 120, and of G on electrode 130.
   Removal Vf from electrodes 110 and 120 and G from electrode 130.
   Put electrodes 110, 120 and 130 in high impedance state (totally left open) in order to keep all charges trapped in electrodes.
   Count up the charges trapped on electrode 120. This result is called C2.
(4) Phase CU2 get with the following way:
   Application of Vf on electrodes 110, 120 and 130.
   Removal Vf from electrodes 110, 120 and 130.
   Put electrodes 110, 120 and 130 in high impedance state (totally left open) in order to keep all charges trapped in electrodes.
   Count up the charges trapped on electrode 120. This result is called CU2.

On FIG. 2 bold character identify the electrode where the charges are measured.

The complete sensor system is illustrated in the form of an electric equivalent scheme of individual capacitive components on FIG. 3, wherein:
   $C_{BG}$ corresponds to the capacitive component between the ground (for example the chassis of a car) and a target 10 (for example a passenger seated on a seat of a car),
   $C_{1B}$, $C_{2B}$ and $C_{UB}$ correspond respectively to the capacitive component between the target 10 and the electrodes 110, 120 and 130,
   $C_{1G}$, $C_{2G}$ and $C_{UG}$ correspond respectively to the capacitive component between the ground and the electrodes 110, 120 and 130, and
   $C_{1U}$, $C_{12}$ and $C_{2U}$ correspond respectively to the capacitive component between the electrodes 110 and 130, between the electrodes 110 and 120, and between the electrodes 120 and 130.

Each of the 4 above combinations may be expressed as the summation of capacitive components composing the sensor system illustrated on FIG. 3:

$$C1 = C_{1U} + C_{1B} + C_{1G} \quad (1)$$

$$CU1 = C_{1B} + C_{1G} \quad (2)$$

$$C2 = C_{2U} + C_{2B} + C_{2G} \quad (3)$$

$$CU2 = C_{2B} + C_{2G} \qquad (4)$$

The inventors, after a lot of searches and experiments, have uncovered that using and combining some relevant information issued from the above 4 combinations can successively:

1—Get information about drift caused by temperature and humidity,

2—From this information, compensate drift on data, and

3—From compensated data, determine, on reliable basis, surface of a target covering the sensor as well as the distance separating the sensor from the target.

More precisely the inventors have uncovered that in order to know the behaviour of these 4 phases versus surface occupation, distance, temperature and humidity variation, it is necessary to run a measurement campaign to characterize them.

For this, the inventors took a conductive reference target 10 having a length which is equal to the length of the sensor 100 (ie equal to the length of the electrode 130 and equal to the sum of the lengths of the two electrodes 110 and 120 as illustrated on FIG. 4).

The inventors successively displace step by step said reference target 10 in regard of the sensor 100, in parallel to the longitudinal direction of the sensor 100. Arbitrary the inventors take a resolution of ¼ of sensor length and m steps, with m=7 in the non limitative example, for this displacement and surface variation. But of course any other resolution and/or number m of steps must be taken.

The displacement starts arbitrary by left side and covers the sensor 100, on m successive steps, by incremental step of ¼ of surface.

On FIG. 4:

¼ L means ¼ of sensor length covered by left side.

½ L means ½ of sensor length covered by left side.

¾ L means ¾ of sensor length covered by left side.

C (for "center") means the target covers totally the sensor 100.

¾ R means ¾ of sensor length covered by right side.

½ R means ½ of sensor length covered by right side.

¼ R means ¼ of sensor length covered by right side.

Moreover at each step of the m steps of this relative displacement, the inventors move the reference target 10 progressively away the sensor 100, step by step, from a distance Z of 0 mm (contact) to 100 mm (considered as infinite distance). Arbitrary in a non limitative example, the inventors displaced the target 10 from the sensor 100 by a number n=38 steps, from 0 mm to 100 mm.

And for each step of relative covering surface (m steps) and distance (n steps), the inventors change temperature and humidity. Arbitrary the inventors combined o=4 different values of temperature (25° C., 40° C., 55° C. and 70° C.) with p=3 different values of humidity (RH=50%, 70% and 95%) leading to o·p=4×3=12 combinations of temperature and humidity.

All the responses corresponding to the 4 identified phases (C1, CU1, C2 and CU2) are recorded for each of the m=7 relative positions illustrated on FIG. 4, that for each of n=38 respective distances Z, and all that for each of o×p=12 combinations of values of temperature and humidity.

The inventors have determined that the 4 phases C1, CU1, C2 and CU2 lead to 3 typical combinations.

First is CU1=f(C1).

Second is CU2=f(C2).

Third is CU1=f(CU2).

Considering CU1=f(C1) (pixel 1) and CU2=f(C2) (pixel 2) (see FIG. 5) the inventors noticed that the slopes $$a_1 = \Delta CU1/\Delta C1$$

$$a_2 = \Delta CU2/\Delta C2$$

are practically constant, whatever sensor surface covered, distance, temperature and humidity are.

However the origin of each curves CUo for distance approaching the infinite is moving on, ie depends, with temperature and humidity.

This observation of the inventors leads to a standout characteristic since the above 4 phases allow to obtain information about temperature (T°C.) and humidity (RH %) couple: (T°C., RH %)=f(CUo)

This characteristic may be explained with the phase ratio $CU1/C1 = (C_{1B} + C_{1G})/(C_{1U} + C_{1B} + C_{1G})$.

The same terms are present at numerator and denominator, except that denominator includes further term $C_{1U}$ which represents the local capacitor between electrodes 110 and 130 which is sensitive at temperature and humidity (dependance of dielectric constant of support of the electrodes with temperature, and humidity)

The same characteristic applies for pixel 2, since $$CU2/C2 = (C_{2B} + C_{2G})/(C_{2U} + C_{2B} + C_{2G}).$$

Now considering CU2=f(CU1) (see FIG. 6) the inventors noticed:

the angle α of CU2 versus CU1 is function of the surface of the sensor 100 covered by the reference target 10 (here step of resolution is ¼ of sensor length) whatever distance, temperature and humidity are, the origin O of curves CU2 and CU1 are slightly depending of temperature and humidity, but the inventors determined that such offset can be compensated by means of information coming from CU1=f(C1) and CU2=f(C2), the position of a point P in plan CU2=f(CU1) is function of distance Z from target 10 to sensor 100.

This characteristic can be explained with the phase ratio CU2/CU1 since $$CU2/CU1 = (C_{2B} + C_{2G})/(C_{1B} + C_{1G}).$$

When no target 10 is in front of the sensor 100 (distance=infinite) slightly the same terms are at numerator and denominator of CU2/CU1:

$$C_{2G} \# C_{1G}$$

$$C_{1B} = C_{2B} = 0$$

In case a target 10 partially covers the sensor 100, $C_{1B}$ is different from $C_{2B}$ because these capacitors depend on the surface of the target 10 covering each pixel electrode 110 or 120. These two capacitors measure the unbalanced surface covering pixel 110 and pixel 120.

The inventors have uncovered that these 3 outstanding characteristics can:

compensate sensor drift caused by temperature and humidity, calculate surface occupied by a target facing the sensor 100, and calculate distance between sensor 100 and a target.

More precisely on the basis of the above established facts, the inventors propose a method which is split in 2 parts: a "Preparation" part and a "Detection" part. These two parts will be described more in detail now.

1. Preparation Part

This preparation part is divided in 3 main steps: 1) the generation of a Temperature and Humidity Look Up Table "LookTRH", 2) the generation of 3 Look Up Tables corresponding to the Angle ("LookAngle") and the Origins (OCU1, OCU2) of curves Cu=f(C) ("LookOCU1" and "LookOCU2") and 3) the generation of a Distance Look Up Table ("Lookabs").

11—Step 1: Temperature and Humidity Look Up Table Generation "LookTRH".

The aim of this Table is to give a correspondence between real capacitive measures and the temperature and humidity parameters so as to compensate drift due to the temperature and humidity.

Construction of this Table may be operated according to various process. A specific one of such process will be described as step 1 in regard of the illustration of FIG. 7.

From the 2 curves:

$$CU1=f(C1)$$

$$CU2=f(C2)$$

The 2 following slopes are calculated:

$$\alpha 1 = \frac{\Delta C1}{\Delta CU1}$$

$$\alpha 2 = \frac{\Delta C2}{\Delta CU2}$$

After that interception of the 2 curves with abscissa, B1 and B2, is calculated.

writing $CU1=\alpha_1 C1+\beta_1$, abscissa $B1=\beta 1/\alpha 1$
writing $CU2=\alpha_2 C2+\beta_2$, abscissa $B2=\beta 1/\alpha 2$ The average $B=(B1+B2)/2$ of the two calculated abscissa is determined.

Then for each o×p couple of temperature and humidity, a Look Up Table of $B=(B1+B2)/2$ is constructed as illustrated on FIG. 7. With o×p combinations of temperature and humidity, the Look Up Table LookTRH has of course o×p inputs. In other words the shape of the LookTRH Table is o×p versus 2, ie an output B for each one the o×p inputs.

Of course the specific table illustrated on FIG. 7 is only an example and may not be considered as limitative.

12—Step 2: Angle and OCU1, OCU2 Look Up Tables Generation (See FIG. 8)

The aim of Angle Look Up Table is to give a correspondence between a real capacitive measure or combination of real capacitive measures and the amount of target surface covering a sensor, for a plurality of temperature and humidity parameters.

Construction of this Table may be operated according to various process. A specific one of such process will be described in regard of the illustration of FIG. 8.

To construct the Angle Look Up Table "lookAngle", the angle $\Delta m=\Delta CU2/\Delta CU1$ is calculated from the curves $CU2=f(CU1)$ illustrated on FIG. 8a, for each o×p couple of temperature and humidity of Look Up Table "LookTRH" and for each of the m relative positions between the reference target 10 and the sensor 100 illustrated on FIG. 8b. FIG. 8b illustrates m=7 relative positions, varying from one to the other of ¼ of the length of the reference target 10. With o×p combinations of temperature and humidity and m relative positions, the Look Up Table LookAngle has o×p×m inputs. In other words the shape of the LookAngle Table is o×p×m versus 2, ie an output $\Delta m$ for each one the o×p×m inputs. In practice such Look Up Table may be divided for example into o×p elementary Look Up Table having each m inputs.

Of course the invention is not limited to this specific embodiment.

Then the inventors propose to construct two Tables LookOCU1 and LookOCU2 to give a correspondence between the abscissa and ordinate origins of the curves CU1 and CU2, with a plurality of temperature and humidity parameters.

Construction of this Table may be operated according to various process. A specific one of such process will be described in regard of the illustration of FIG. 9.

More precisely the inventors propose a) to calculate and trace a line $CU2=f(CU1)$ for m=C (for all o×p points of T/RH), b) to calculate and trace for each m a line for all o×p points of T/RH and c) to calculate the intersection of slope C and all other line m for all o×p points of T/RH.

Then for each index T/RH, the point position averages of the abscissa origin OCU1 and the ordinate origin OCU2 of the curves $CU2=f(CU1)$ (see FIG. 9) are stored in two Look Up Tables called "LookOCU1", "LookOCU2", as illustrated on FIG. 9b.

With o×p combinations of temperature and humidity, the Look Up Tables LookOCU1 and LookOCU2 have o×p inputs. In other words the shape of the LookOCU1 and LookOCU2 Tables is o×p versus 2, ie an output "average of origin OCU1 or OCU2" for each one the o×p inputs.

13—Step 3: Distance Look Up Table Generation Lookabs

The aim of this Table is to give a correspondence between a real capacitive measure or a combination of capacitive measures and the distance separating a target from a capacitive sensor.

Construction of this Table may be operated according to various process. A specific one of such process will be described as step 3 in regard of the illustration of FIG. 10.

This process involves a calculation on the basis of a theorem known as Pythagore theorem.

The inventors propose to calculate the distance separating the target 10 from the sensor 100 on the basis of a trigonometric function involving the values CU1 and CU2 corrected by specific abscissa origin OCU1(TRH) and ordinate origin OCU2(TRH).

Considering $CU2=f(CU1)$ and the previous Look Up Tables "LookTRH",

"*LookAngle*", "*LookOCU1*" and "*LookOCU2*", $$a \text{ value ABS} = \sqrt{\frac{(CU1-OCU1(TRH))^2 + }{(CU2-OCU2(TRH))^2}}$$

is calculated for each surface position m (1 to 7 in the specific case illustrated on the drawings), for each couple of T/RH (12 in the above described case) which define the origins OCU1 and OCU2 and for each distance (38 in a specific and not limitative case).

The value ABS corresponds to the distance between the target 10 and the sensor 100.

All the values calculated for ABS are stored in a Look Up Table called "LookAbs".

With o×p combinations of temperature and humidity, m steps of relative displacement and n step of distances, the Look Up Table Lookabs has o×p×m×n inputs. In other words the shape of the Lookabs Table is o×p×m×n versus 2, ie an output ABS for each one the o×p×m×n inputs. In practice such Look Up Table may be divided for example into o×p elementary Look Up Table having each m×n inputs.

In summary the preparation part leads to construction of 5 Look Up Tables: "LookTRH", "LookAngle", "LookOCU1", "LookOCU2", "LookAbs" and 2 characteristics parameters: $\alpha 1$, $\alpha 2$ (slope of curves $CU1=f(C1)$ and $CU2=f(C2)$).

With these 5 Look Up Tables and the two characteristic parameters $\alpha 1$, $\alpha 2$, the surface of the target 10 covering the sensor 100 and the distance separating the target 10 and the sensor 100 may be calculated in "real time" during the "detection part".

2—Detection Part

This detection part is divided in 4 main steps 1) the calculation of an index pointer for "LookTRH", 2) the calculation of OCU1 and OCU2 origins, 3) the calculation of position m, and the calculation of the angle which give an information about surface occupation and 4) the calculation of distance between target 10 and sensor 100.

21—Step 1: Calculation of Index Pointer for "LookTRH"

Signals CU1, C1, CU2, C2 are acquired on sensor 100 in real time.

From the two relationships CU1=f(C1) and CU2=f(C2), the $\alpha_1$, $\alpha_2$, interception abscissa and then the corresponding index pointer (B1+B2)/2 are calculated. With this index (straight or by interpolation) the T/RH couple information are pulled out from Look Up Table "LookTRH".

22—Step 2: Calculation of OCU1 and OCU2 Origins.

With the previous T/RH couple information, the origins OCU1 and OCU2 for curve CU2=f(CU1) are pulled out from Look Up Tables "LookOCU1", "LookOCU2" (straight or by linear interpolation).

23—Step 3: Calculation of Position m, and Calculation of the Angle Which Give Surface Occupation The slope a=(CU2−OCU2)/(CU1−OCU1) is calculated and from this calculated slope a, as well as from the T/RH couple information obtained at step 1, a value representative of position is pulled out from Look Up Table "LookAngle". This value is representative of surface occupation by a target 10, such as a passenger, in front of sensor 100.

In other words for each capacitive sensor 100, the value pulled out from the Look Up Table "LookAngle" is representative of the surface Sdi of the target 10, such as an occupant, covering the sensor 100.

24-Step 4: Calculation of Distance Between Target and Sensor.

$$A \text{ value } D = \sqrt{(CU1n - OCU1(TRH))^2 + (CU2n - OCU2(TRH))^2}$$

is calculated.

Then on the basis of this value D, as well as from the T/RH couple information obtained at step 1 and the angle value obtained at step 3, an estimated distance is pulled out from Look Up Table "LookAbs" (straight or by linear interpolation).

In other words for each capacitive sensor 100, the value pulled out from the Look Up Table "LookAbs" is representative of the distance di separating the target 10 from the sensor 100.

In summarize from data acquisition CU1, C1, CU2, C2 the above described method allows to determine to calculate surface occupation Sdi by a target 10 placed in front of sensor 100 and its distance di from said sensor 100.

This complete detection method is illustrated on FIG. 11.

It corresponds also to the first step 200 of the method illustrated on FIG. 16.

Results got by the inventors by implementation of this method, for variation of surface in all temperature and humidity range, are displayed in FIG. 12. On this FIG. 12, Y axis corresponds to the estimated (calculated) surface Sdi while the X or abscissa axis corresponds to the real surface.

Distances di calculated up to one inch on the basis of these results are displayed in FIG. 13.

FIGS. 12 and 13 show that this method offers a reliable determination both of the distance di separating a target 10 from a sensor 100 and the surface Sdi of the target 10 covering the sensor 100.

Particularly this method allows to compensate the drifts caused by temperature and humidity.

B. Determination of the Morphology of an Occupant in an Automotive Seat in Accordance with the Present Invention.

In order to get passenger discrimination it is necessary to place judiciously several sensors 100 in a seat. Industrial constraints and cost issue limit of course the number of sensors.

FIGS. 14 and 15 illustrate a preferential but non limitative implantation of such sensors 100 in a seat in accordance with the present invention.

The sensors 100 illustrated on FIGS. 14 and 15 are provided in the seating horizontal supporting part of a seat. Of course if necessary additional sensors 100 may be also provided in the back vertical part of the seat.

The specific and non limitative embodiment illustrated on FIGS. 14 and 15 comprises 6 sensors 100. Preferentially each sensor 100 comprises 3 electrodes 110, 120 and 130 as described above and consequently each sensor 100 defines two pixels from respective main electrodes 110, 120.

We distinguish on FIGS. 14 and 15:

four short pixel sensors (having typically a length about 9 cm) 100S1, 100S2, 100S5 and 100S6, and two long pixel sensors (having typically a length about 29 cm) 100S3 and 100S4.

Sensors 100S1 and 100S6 are provided on the external lateral parts of the seat, named bolster.

Sensors 100S2 and 100S5 are provided on the central part of the seat, in the vicinity of said bolster.

Preferentially all four sensor 100S1, 100S2, 100S3 and 100S4 are aligned from left to right on the seat, approximately in the middle of the depth of the seat, ie approximately at the same distance from the front and the back of the seat.

Sensor 100S3 and 100S4 are provided respectively on each side of the sensors 100S2 and 100S5, on the central part of the seat, sensor 100S3 being placed at onward of seat while sensor 100S4 is placed backward of seat.

For each of the 6 sensors (100S1 to 100S6) a surface occupation Sdi and an associated distance di is determined, as schematically illustrated by step 200 on FIG. 16.

When each sensor 100 comprises two pixels corresponding to main electrodes 110, 120, as it is the case with the specific embodiment illustrated on FIG. 1, using six sensors 100 leads to 12 individual information pixel.

Preferentially the method in accordance with the present invention comprises a filtering step to determine the values Sdi and di corresponding to an "empty" sensor, ie a sensor having no detected target in front of it.

A distance threshold is used to decide if a sensor is empty or not. Such distance threshold is called $d_{inf}$ on FIG. 17.

If $di > d_{inf}$ then sensor 'i' is considered empty. If $di \leq d_{inf}$ sensor 'i' is considered occupied.

For example we can choose dinf=20 mm

Such filtering step may be either operated preceding the weighting step 210 illustrated on FIG. 16, so as to eliminate the values Sdi and di corresponding to an "empty" sensor, or may be operated to prepare a step referenced 220 on FIG. 16 corresponding to an analysis of coherence so as to reject all non coherent profile of morphology.

The characterization of all the sensors 100S1 to 100S6 is done arbitrary from left side to right side. Depending of the value Sdi determined for each "occupied" sensor 100, corresponding Si values are established, Si values being arbitrary comprised between 0.25 and 1.75, with step of 0.25. Si=0.25 corresponds to the case illustrated on the bottom of FIG. 4 (¼ of sensor covered from left). Si=1 corresponds to the case illustrated on the middle of FIG. 4, ie a target centred on the sensor. Si=1.75 corresponds to the case illustrated on the top of FIG. 4 (¼ of sensor covered from right).

For using this characterization in the seat it is necessary to re-direct sensor sense because sensor placement is symmetrical and of course variation between left side and right side are in opposite.

In other words for left side surface detected sense (sensor 100S1 and 100S2) the retained Si is moving from 0.25 to 1.75.

For right side (sensor 100S5 and 100S6), sense surface detected is in opposite sense. Consequently the retained Si is =2−$S_{detected}$.

A very simple way to classify the occupant, ie to determine the morphology of an occupant detected on a seat, would be to operate a straight calculation by counting up the number of pixel of the sensors 100S1 to 100S6 which are covered by a target.

However such a simple method is distorted and causes some errors.

Indeed surface projection on sensor 100 is always seen in the same way, whatever the distance di is. In other words with such a simple calculation method, the passenger's outline would not be taken into account and some time errors can occur.

To avoid this disturbance the inventors propose, in accordance with the present invention, to balance the calculated surface Si by a weighting parameter Wi based on the corresponding respective distance di.

To do this, the minimum distance di among sensors 100S1 to 100S6 (at least for the four sensors 100S1, 100S2, 100S5, 100S6) is detected. Then after for each sensor 100S1, 100S2, 100S5 and 100S6, a balanced coefficient called "Wi" is calculated.

Coefficient Wi may be calculated according to a plurality of functions.

Preferentially coefficients Wi=(di−dinf)/[min(d1 to dp)−dinf]

Wherein di=distance calculated for sensor i, dinf=infinite distance, that is to mean when seat is considered empty (for example 20 mm), min(d1 to dp)=minimum distance calculated for all p sensors 100S1, 100S2, 100S5, 100S6.

After calculation of coefficients Wi, each surface Si calculated for each sensor 100 is multiplied at step 210 by the corresponding Wi coefficient, and this for sensors 100S1, 100S2, 100S5, 100S6. Such weighting step 210 takes into account the passenger outline and get a passenger consistent pattern surface.

For example such weighting step 210 allows to distinguish between two occupant profiles being in a standard centered position on a seat, as illustrated on FIG. 18, one being a narrow profile and the other being a wide profile. Without such a weighting prosecution 210, the values of Si obtained for the two occupant profiles would have similar issues when determining the morphology.

Wi values are illustrated on the left of FIG. 16. Wi is maximum with the minimal distance di. Note that if measured di>dinf, then we consider di=dinf.

After the weighting step 210, and before counting up all elementary surfaces Si at step 240, the inventors propose to operate a step 220 to eliminate non coherent profiles. Indeed the inventors have uncovered that some specific situations may lead to non coherent profiles.

A specific non coherent profile is for example the case of a child well seated in the middle of the seat but with hand on bolster. This of course could cause an error because the sensors 100 "see" the child's breadth bigger and could cause a misclassification (a child is seen like an adult).

Preferentially the step 220 comprises firstly a "centre detection" step. The aim of this centre detection step is to retain only the information corresponding to a sensor 100 which is considered as totally covered. Indeed in practice, this is rarely reached since many passengers have bad positioning.

Preferentially the centre detection step considers a sensor 100 is totally covered (centre position) if the surface Si is included between value defined as 1−α=<Si=<1+α, with for example α=0.25. Threshold α may be modified if necessary.

Consequently the information issued from the sensor is not retained if Si<1−α or if Si>1+α.

Secondly the coherence analysis step 220 comprises preferentially a step for distinguishing two adjacent sensors surface Si and Si+1 (greater or lesser) considering a second parameter β in order to know the slope progression from one sensor to another. That means if the surface Si move like: Si<S(i+1)+β or Si>S(i+1)−β there is variation and the slope of variation is calculated and compared with a respective threshold for coherence analysis. For example β=0.125.

Multiplying all surfaces Si by the balance coefficient Wi (Si*Wi) and managing surface tolerance as described above, allow to check the consistency of profile in order to detect anomaly and avoid misclassification.

After these treatments, for all elementary surface, Si by Wi, α, β, some atypical cases may be eliminated at step 220.

For example FIG. 19 shows an atypical case of a child with hand on bolster leading to a down slope between sensor 100S4 and sensor 100S5.

Such a profile is not contiguous like the one of FIG. 18. This profile which is typically a small child seated in the central inset of the seat with his left hand lay down on bolster, must be eliminated at step 220.

Other typical non coherent cases are illustrated on FIG. 20. This FIG. 20 illustrates detection of a "hole" (that means a detected distance which is greater than dinf (for example but non limitatively a distance greater than 20 mm). In case of such detection of a hole, the next adjacent sensor or pixel is not retained for classification. For example if a hole is detected between sensor 100S2 and sensor 100S6, only sensors 100S1 and 100S2 are used for classification. Such operation is equivalent to force Si to 0 for sensor 100S6. So for opposite side if a hole is detected between sensor 100S1 and 100S5 only sensors 100S5 and 100S6 are used for classification. Such operation is equivalent to force Si to 0 for sensor 100S1.

The criteria α to determine if a sensor is covered or not and consequently if a hole exists or not, may change from a system to the other.

The two first lines of FIG. 20 illustrates a case wherein a hole corresponds to a sensor fully not covered.

The two last lines of FIG. 20 illustrates a case wherein a hole corresponds only to a ½ pixel, ie a ¼ sensor, not covered. This last case may be implemented by the step referenced 230, 232, 234 and 236 on FIG. 16, wherein if sensor 100S2 is measured as no more than ¾ covered, Si for sensor 100S1 is forced to 0, and if sensor 100S5 is measured as no more than ¾ covered, Si for sensor 100S6 is forced to 0.

Preferentially during analysis of no coherent profiles, the system considers the sign of the slope variation between 2 adjacent pixels for the central sensors 100S1, 100S2, 100S5 and 100S6. Examples of no coherent profile are given on FIGS. 21 and 22 which illustrates an anomalous sign changing of slope between two adjacent pixels.

After normalization of all elementary surfaces Si by Wi coefficients, all possible cases for "hole" detection and their treatment are considered, so for the detection of all abnormal slope variation between two adjacent sensors (with the treatment of α and β parameters described previously).

An example of "truth table" for such treatment is illustrated on FIG. 23.

Thirty two cases are listed. "Left side" relates to left sensors 100S1 and 100S2. "Right side" relates to right sensors 100S6 and 100S5. On FIG. 23 the state of each sensor is identified as E=empty, L=left occupation, C=center (means sensor totally covered) and R=right occupation.

On FIG. 23:

first line corresponds to the case of two adjacent sensors 100S1 and 100S2 or 100S5 and 100S6 which are detected empty. This case is not taken into account.

second line corresponds to the case of an external sensor 100S1 or 100S6 empty, but only an adjacent part of the next sensor 100S2 and 100S5 being occupied. Such case is also considered as erroneous and is not taken into account.

third and fourth lines correspond to cases wherein external sensor 100S1 or 100S6 is empty, but the next sensor 100S2 and 100S5 is either fully occupied or occupied on its part opposite said external sensor. In this case the Si value obtained for sensor 100S2 and/or sensor 100S5 is retained.

$5^{th}$ line corresponds to cases wherein the external sensor 100S1 or 100S6 is covered only on its external part, but the adjacent sensor 100S2 or 106S5 is empty. This is a hole detection which is not retained.

$6^{th}$ line corresponds to cases wherein both the external sensor 100S1 or 100S6 and the adjacent sensor 100S2 or 100S5 are covered only on their external part. Such case is also considered as erroneous and is not taken into account.

$7^{th}$ line corresponds to cases wherein the external sensor 100S1 or 100S6 is covered only on its external part, while the adjacent sensor 100S2 or 100S5 is fully covered. In this case the Si value obtained for sensor 100S2 and/or sensor 100S5 is retained.

$8^{th}$ line corresponds to cases wherein the external sensor 100S1 or 100S6 is covered only on its external part, while the adjacent sensor 100S2 or 100S5 is covered on its opposite part. In this case the Si value obtained for sensor 100S2 and/or sensor 100S5 is retained.

$9^{th}$ line corresponds to cases wherein the external sensor 100S1 or 100S6 is fully covered, but the adjacent sensor 100S2 or 100S5 is empty. This is a hole detection which is not retained.

$10^{th}$ line corresponds to cases wherein the external sensor 100S1 or 100S6 is fully covered, but the adjacent sensor 100S2 or 100S5 is only covered on a part adjacent said external sensor. In this case a summation of the signal obtained from these couples of sensors (100S1 and 100S2 or 100S5 and 100S6) is operated only if the opposite internal sensor (ie respectively 100S5 and 100S2) is empty. Otherwise the signals are eliminated.

$11^{th}$ line corresponds to cases wherein both the sensors 100S1 and 100S2 or 100S5 and 100S6 are fully covered. In such case the signals are summed.

$12^{th}$ line corresponds to cases wherein the external sensor 100S1 or 100S6 is fully covered, but the adjacent sensor 100S2 or 100S5 is only covered on a part opposite this external sensor. In such a case, the signal issued from the internal sensor 100S2 and/or 100S5 is retained, but the signal issued from the external sensor 100S1 and/or 100S6 is retained only if $S1<S2+β$ or $S6>S5-β$.

$13^{th}$ line corresponds to cases wherein the external sensor 100S1 or 100S6 is covered only on its internal part, and the adjacent sensor 100S2 or 100S5 is empty. This is a hole detection which is not retained.

$14^{th}$ line corresponds to cases wherein the external sensor 100S1 or 100S6 is covered only on its internal part, and the adjacent sensor 100S2 or 100S5 is only covered on a part adjacent said external sensor. In this case a summation of the signal obtained from these couples of sensors (100S1 and 100S2 or 100S5 and 100S6) is operated only if the opposite internal sensor (ie respectively 100S5 and 100S2) is empty. Otherwise the signals are eliminated.

$15^{th}$ line corresponds to cases wherein the external sensor 100S1 or 100S6 is covered only on its internal part, and the adjacent sensor 100S2 or 100S5 is fully covered. In such case the signals are summed.

$16^{th}$ line corresponds to cases wherein the external sensor 100S1 or 100S6, as well as the adjacent sensor 100S2 or 100S5 are covered only on their internal part. In such a case, the signal issued from the internal sensor 100S2 and/or 100S5 is retained, but the signal issued from the external sensor 100S1 and/or 100S6 is retained only if $S1<S2+β$ or $S6>S5-β$.

In order to have an information about the quality of the discrimination, preferentially an associated "confidence test" is operated before step 240.

Confidence test is based preferentially on distance detection and may be calculated as follows:

Confidence rate for empty seat cases:

$c=1-$(number of occupied sensors/total number of sensors)

Confidence rate when classification is impossible (small sensors 100S1, 100S2, 100S3 and 100S4 are all empty):

$c=0$

The confidence rate for others cases (occupied seat) is based on distance parameter:

$c=1-(\Delta d/dinf)$

In order to have a confidence, $0<c<1$:

if $\Delta d>dinf$, $\Delta d=dinf$

For backward position:

$\Delta d=|\min(d1,d2,d5,d6)-d4|$

For forward position:

$\Delta d=|\min(d1,d2,d5,d6)|d3|$

For left positioning:

$\Delta d=|\min(d1,d2)-d5|$ (or d6 depending on case)

For right positioning:

$\Delta d=|\min(d5,d6)-d2|$ (or d1 depending on case)

Of course as soon as an anomaly like no coherent profile, hole, no coherent slope, is detected, the confidence test is decreased.

After these different treatments, the classification of the passenger may be determined.

Preferentially this classification is operated by counting up the number of surface Si (number of pixel, or half pixel depending of the resolution wanted) of the central chain of sensors 100S1, 100S2, 100S5, 100S6.

In other words $$\text{Classification} = \sum_{i=1,2,5,6} Si*Wi$$

After regarding statistical distribution linked with hip width versus morphological class, different threshold are expressed as number of pixel for all classes.

Typically FMVSS 208 regulation is displayed on FIG. 24.

A Data Base corresponding to recordation of a passengers sample is illustrated on FIG. 25.

The results get with this Data Base are listed on FIG. 26.

Analysis of these results leads to demonstration that a threshold separates the Σ Si×Wi values for child from the Σ Si×Wi values for adult. Typically this threshold is about 1.35 as illustrated on FIG. 26.

A proposition of thresholds placement for class separation is done on FIG. 27. Such thresholds illustrated on FIG. 27 are of course only non limitative examples.

To summarize the method illustrated on FIG. 16 comprises the steps of:

Calculation 200 of di and Si for each individual sensor 100,
Calculation 210 of Wi for each individual sensor 100,
Treatment 220 of no coherent profile,
Classification 240 of passengers by calculating $$\sum_{i=1,2,5,6} Si*Wi$$

and the associated confidence test.

Of course the present invention is not limited to the above specification which is given only for illustration. The present invention includes any alternative in conformity with the enclosed claims.

FIGS. 28 and 29 illustrate a variant of implantation for the sensors. More precisely, FIGS. 28 and 29 illustrate a line of four sensors 100S1, 100S2, 100S5 and 100S6 similar to the corresponding sensors of FIGS. 14 and 15, provided on the inset of the seat, near the back, and two additional short sensors 100S7 and 100S8 provided on the same inset of the seat, near the front part of the seat and respectively near the bolsters.

1FIG. 30 illustrates another variant of implantation for the sensors, wherein the sensors 100S3 and 100S4 of FIGS. 14 and 15 which are parallel to sensors 100S1, 100S2, 100S5 and 100S6, are replaced by sensors 100S9 and 100S10 transverse to sensors 100S1, 100S2, 100S5 and 100S6.

What is claimed is:

1. A method for determining the morphology of the occupant of an automotive car, characterized in that it comprises the steps of:
    collecting (200) the outputs of a plurality of capacitive sensors (100) provided on a seat,
    determining, for each capacitive sensor (100):
    a first value representative of the distance (di) separating a target (10) from said sensor (100), a second value (Sdi) representative of the surface of said sensor (100) covered by the target (10), and
    a weighting coefficient based on the first value representative of the distance separating the target from the corresponding sensor;
    correcting (210) each second value (Sdi) representative of the surface of the corresponding sensor (100) covered by the target (10) by applying to said second values the respective weighting coefficient (Wi), and
    determining (240) the morphology of the target (10) on the basis of the plurality of corrected second values (SdixWi).

2. The method of claim 1, characterized in that a respective weighting coefficient is determined by function Wi=(di−dinf)/[min(d1 to dp)−dinf], wherein
    di=distance calculated for each sensor i,
    dinf=an estimated infinite distance, that is to mean when seat is considered empty
    min(d1 to dp)=minimum distance calculated for all p sensors (100).

3. The method of claim 1, characterized in that the step of determining the morphology comprises counting up the number of sensors (100) covered by a passenger in order to define a corresponding class of morphology.

4. The method of claim 1, characterized in that the method comprises a step of filtering which eliminates all measured values (di, Sdi) for which the first value representative of the distance (di) separating a target (10) from the sensor (100) is above a threshold ($d_{inf}$).

5. The method of claim 1, characterized in that the method further comprises a step of coherence analysis (220) for eliminating non coherent profiles of morphology.

6. The method of claim 1, characterized in that the method further comprises a centre detection step to retain only signal issued by a sensor (100) which is considered as totally covered.

7. The method of claim 6, characterized in that the centre detection step retains signal issued by a sensor (100) only if a measured surface Si is included between value defined as 1−α=<Si=<1+α.

8. The method of claim 1, characterized in that the method further comprises a step for analysing the slope progression from one sensor to another.

9. The method of claim 1, characterized in that the method further comprises a step for detecting an abnormal down slope between two adjacent sensors (100).

10. The method of claim 1, characterized in that the method further comprises a step for detecting a distance which is greater than a threshold (dinf), so as to eliminate the next adjacent sensor from classification.

11. The method of claim 1, characterized in that the method further comprises a step of coherence analysis which involves at least one of the following items:
    when two adjacent sensors (100S1 and 100S2 or 100S5 and 100S6) are detected empty, the corresponding signals are not taken into account,
    when an external sensor (100S1 or)00S6) is empty, but only an adjacent part of the next sensor (100S2 and 100S5) is occupied, the corresponding signals are not taken into account,
    when an external sensor (100S1 or 100S6) is empty, but the next sensor (100S2 and 100S5) is either fully occupied or occupied on its part opposite said external sensor, the signal obtained from the said next sensor ( )0S2 and/or sensor 100S5) is retained,
    when an external sensor (100S1 or 100S6) is covered only on its external part, but the adjacent sensor (100S2 or 100S5) is empty, the signals considered as a hole detection are not retained,
    when both an external sensor (100S1 or 100S6) and the adjacent sensor (100S2 or 100S5) are covered only on their external part, the are not taken into account,
    when an external sensor (100S1 or 100S6) is covered only on its external part, while the adjacent sensor (100S2 or 100S5) is fully covered, the signal obtained from said next sensor (100S2 and/or sensor 100S5) is retained, when an external sensor (100S1 or 100S6) is covered only on its external part, while the adjacent sensor (100S2 or 100S5) is covered on its opposite part, the signals obtained from said next sensor (100S2 and/or sensor 100S5) is retained, when an external sensor (100S1 or 100S6) is fully covered, but the adjacent sensor (100S2 or 100S5) is empty, the signals considered as a hole detection are not retained, when an external sensor (100S1 or 100S6) is fully covered, but the adjacent sensor (100S2 or 100S5) is only covered on a part adjacent said external sensor, a summation of the signal obtained from these couples of sensors (100S1 and 100S2 or 100S5 and 100S6) is operated only if the opposite internal sensor (ie respectively 100S5 and 100S2) is empty, when both the sensors (100S1 and 100S2 or 100S5 and 100S6) are fully covered, the signals are retained, when an external sensor (100S1 or 100S6) is fully covered, but the adjacent sensor (100S2 or 100S5) is only covered on a part opposite this external sensor, the signal issued from the internal sensor (100S2 and/or 100S5) is retained, but the signal issued from the external sensor (100S1 and/or 100S6) is retained only if a condition is applied, when an external sensor (100S1 or 100S6) is covered only on its internal part, and the adjacent sensor (100S2 or 100S5) is empty, the signals considered as a hole detection are not retained, when an external sensor (100S1 or 100S6) is covered only on its internal part, and the adjacent sensor (100S2 or 100S5) is only covered on a part adjacent said external sensor, a summation of the signal obtained from these couples of sensors (100S) and 100S2 or 100S5 and 100S6) is operated only if the opposite internal sensor (ie respectively 100S5 and 100S2) is empty, when an external sensor (100S1 or 100S6) is covered only on its internal part, and the adjacent sensor (100S2 or 100S5) is fully covered, the signals are summed, when an external sensor (100S1 or 100S6), as well as the adjacent sensor (100S2 or 100S5) are covered only on their internal part, the signal issued from the internal sensor (100S2 and/or 100S5) is retained, but the signal issued from the external sensor (100S1 and/or 100S6) is retained only if a condition is applied.

12. The method of claim 1, characterized in that the method further comprises a step of performing a confidence test.

13. The method of claim 1, characterized in that the method further comprises a step of performing a confidence test which is based on distance detection.

14. The method of claim 1, wherein each capacitive sensor (100) comprises at least two electrodes (110,120) covering complementary respective areas of a sensed zone so as to form two balanced pixel sensors.

15. The method of claim 1, wherein each capacitive sensor (100) comprises:
two main electrodes (110,120) covering complementary respective areas of a sensed zone and a third auxiliary electrode (130) covering said complementary respective areas.

16. The method of claim 15, wherein said third auxiliary electrode (130) surrounds the two main electrodes (110,120).

17. The method of claim 1, wherein there are at least four said capacitive sensors (100S1,100S2,100S5,100S6) substantially aligned from left to right on a seat.

18. The method of claim 17, wherein at least an additional sensor (100S3,100S4) is provided onward or backward in regard of the four sensors (100S1,100S2, 100S5, 100S6) substantially aligned.

19. The method of claim 1, wherein said capacitive sensors (100S1, 100S6) are provided on a bolster of a seat.

20. The method of claim 1, characterized in that the method comprises the steps of applying respective controlled electric potentials upon electrodes (110, 120, 130) and subsequently, after breaking said electrical potentials, measuring the electric charges upon at least one selected electrode so as to generate an electrical output.

21. The method of claim 1, characterized in that the method implements a step of selecting a value representative of the distance (di) separating the target (10) from the sensor (100), from a look up table, using as input for this selection a combination of the outputs issued by the capacitive sensor and selecting a value representative of the amount (Sdi) of the surface of the sensor (100) covered by said target (10), from another look up table, using also as input for this selection a combination of the outputs issued by the capacitive sensor.

22. The method of claim 1, characterized in that the method implements look up tables which contain values representative of the distance (di) separating the target (10) from the sensor (100) and/or values representative of the amount (Sdi) of the surface of the sensor (100) covered by said target (10), for a plurality of temperature and humidity values, and the method comprises the step of selecting in the look up tables an output value depending on a combination of the outputs issued by the capacitive sensor which represents real temperature and humidity.

23. The method of claim 1, characterized in that it comprises a step of positioning different threshold on a statistical distribution of morphological classes corresponding to predetermined number of pixels.

24. A system for implementing the method in accordance with claim 1, so as to determine the morphology of the occupant of an automotive car, characterized in that it comprises
means for collecting (200) the outputs of a plurality of capacitive sensors (100) provided on a seat, means for determining for each capacitive sensors (100) a first value representative of the distance (di) separating a target (10) from the sensor (100) and a second value (Sdi) representative of the surface of the sensor (100) covered by the target (10),
means for correcting (210) the second values (Sdi) representative of the surface of the sensors (100) covered by the target (10) by applying to said second values respective weighting coefficients (Wi) based on the corresponding first value (di) representative of the distance separating the target (10) from the respective sensor (100), and
means for determining (240) the morphology of the target (10) on the basis of the collection of corrected second values (SdixWi).

25. Seat for an automotive car characterized in that it comprises means for implementing the method in accordance with claim 1.

* * * * *

UNITED STATES PATENT AND TRADEMARK OFFICE
CERTIFICATE OF CORRECTION

PATENT NO. : 7,987,033 B2
APPLICATION NO. : 11/803914
DATED : July 26, 2011
INVENTOR(S) : Claude Launay et al.

Page 1 of 1

It is certified that error appears in the above-identified patent and that said Letters Patent is hereby corrected as shown below:

In the Claims, Column 18, Claim 11, line 57, please delete "()0S2" and insert --(100S2--.

Column 19, Claim 11, line 35, please delete "(100S)" and insert --(100S1--.

Signed and Sealed this
Twenty-eighth Day of February, 2012

David J. Kappos
*Director of the United States Patent and Trademark Office*